US012388597B2

(12) United States Patent
Khoshnevisan et al.

(10) Patent No.: US 12,388,597 B2
(45) Date of Patent: Aug. 12, 2025

(54) DEMODULATION REFERENCE SIGNAL (DM-RS) DESIGN FOR RATE-SPLITTING MULTI-USER MULTIPLE INPUT MULTIPLE OUTPUT (MU-MIMO) COMMUNICATION

(71) Applicant: QUALCOMM Incorporated, San Diego, CA (US)

(72) Inventors: Mostafa Khoshnevisan, San Diego, CA (US); Jing Sun, San Diego, CA (US); Rajat Prakash, San Diego, CA (US); Xiaoxia Zhang, San Diego, CA (US); Ahmed Abdelaziz Ibrahim Abdelaziz Zewail, San Diego, CA (US); Arumugam Chendamarai Kannan, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 17/940,355

(22) Filed: Sep. 8, 2022

(65) Prior Publication Data
US 2024/0089055 A1    Mar. 14, 2024

(51) Int. Cl.
*H04L 5/00* (2006.01)
(52) U.S. Cl.
CPC .......... *H04L 5/0051* (2013.01); *H04L 5/0094* (2013.01); *H04L 5/0007* (2013.01)
(58) Field of Classification Search
CPC ..... H04L 5/0094; H04L 5/007; H04L 5/0044; H04L 5/0051; H04L 5/0007; H04L 5/0058
See application file for complete search history.

(56) References Cited

U.S. PATENT DOCUMENTS

| 2017/0135114 | A1 | 5/2017 | Hwang et al. | |
| 2020/0162762 | A1* | 5/2020 | Borsos | H04N 21/835 |
| 2022/0256543 | A1* | 8/2022 | Tian | H04L 5/0091 |
| 2023/0155772 | A1* | 5/2023 | Zhang | H04L 5/0007 |
| | | | | 370/277 |

(Continued)

FOREIGN PATENT DOCUMENTS

WO    WO-2018133052 A1    7/2018

OTHER PUBLICATIONS

3GPP TSG RAN WG1 Meeting #71, R1-124690 Title:PDSCH RE mapping IMRs and ZP CSI-RS (Year: 2012).*

(Continued)

*Primary Examiner* — Faruk Hamza
*Assistant Examiner* — Abusayeed M Haque
(74) *Attorney, Agent, or Firm* — Holland & Hart LLP

(57) ABSTRACT

Disclosed is a method of wireless communication. The method is performed at a user equipment (UE). The method comprises receiving, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream, determining, based on the DCI, a DM-RS configuration for the DM-RS for the common stream and for the DM-RS for the private stream, and receiving, based on the DM-RS configuration, the downlink transmission.

28 Claims, 16 Drawing Sheets

(56) References Cited

U.S. PATENT DOCUMENTS

| | | | | |
|---|---|---|---|---|
| 2023/0224903 A1* | 7/2023 | Wang | .................. | H04W 72/121 |
| | | | | 370/312 |
| 2023/0261924 A1* | 8/2023 | Zewail | .................. | H04L 1/0025 |
| | | | | 370/329 |
| 2023/0269735 A1* | 8/2023 | Wang | .................... | H04W 72/40 |
| | | | | 370/329 |
| 2023/0422254 A1* | 12/2023 | Khoshnevisan | ...... | H04L 1/0041 |

OTHER PUBLICATIONS

3GPP TSG RAN#117 R2-2203166 Title:Discussion on data transmission to MN fo rsplit bearer (Year: 2022).*
3GPP TS 36.211: "3rd Generation Partnership Project; Technical Specification Group Radio Access Network; Evolved Universal Terrestrial Radio Access (E-UTRA), Physical Channels and Modulation (Release 17)", V17.2.0, 36211-H20, 3rd Generation Partnership Project, Mobile Competence Centre, 650, Route Des Lucioles, F-06921 Sophia-Antipolis Cedex, France, Jun. 19, 2022, pp. 1-249, XP052191555, Section 6.10.3, sections 5.3 and 7.2.
ETSI TS 136.212: "LTE, Evolved Universal Terrestrial Radio Access (E-UTRA), Multiplexing and Channel Coding (3GPP TS 36.212 version 16.7.0 Release 16)", ETSI Technical Specification, European Telecommunications Standards Institute ,650, Route Des Lucioles, F-06921 Sophia-Antipolis, France, vol. 3GPP RAN, No. V16.7.0, Jan. 25, 2022, pp. 1-259, XP014422603, Section 5.3.3.22.
International Search Report and Written Opinion—PCT/US2023/069819—ISA/EPO—Oct. 17, 2023 (2203406WO).

* cited by examiner

DEMODULATION REFERENCE SIGNAL (DM-RS) DESIGN FOR RATE-SPLITTING MULTI-USER MULTIPLE INPUT MULTIPLE OUTPUT (MU-MIMO) COMMUNICATION

INTRODUCTION

Aspects of the present disclosure generally relate to wireless communications, and more particularly to techniques and apparatuses for multi-user multiple-input multiple-output (MU-MIMO) communication.

Wireless communication systems are widely deployed to provide various telecommunication services such as telephony, video, data, messaging, and broadcasting. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems.

A wireless communication network may include a number of base stations (BSs) that can support communication for a number of user equipments (UEs). A user equipment (UE) may communicate with a base station (BS) via downlink and uplink. The downlink (or forward link) refers to a communication link from the BS to the UE, and the uplink (or reverse link) refers to a communication link from the UE to the BS. As will be described in more detail herein, a BS may also be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipments to communicate on a municipal, national, regional, and even global level. LTE/LTE-Advanced is a set of enhancements to the Universal Mobile Telecommunications System (UMTS) mobile standard promulgated by the Third Generation Partnership Project (3GPP). New Radio (NR), which may also be referred to as 5G, is a set of enhancements to the LTE mobile standard promulgated by the Third Generation Partnership Project (3GPP). NR is designed to by better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

However, as the demand for mobile broadband access continues to increase, there exists a need for further improvements in wireless communications. Preferably, these improvements should be applicable to LTE and/or NR, and/or also to other multiple access technologies and the telecommunication standards that employ these technologies.

SUMMARY

In some aspects of the present disclosure, a method for wireless communication is disclosed, the method being performed at a user equipment (UE), the method may include receiving, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream, determining, based on the DCI, a DM-RS configuration for the DM-RS for the common stream and for the DM-RS for the private stream, and receiving, based on the DM-RS configuration, the downlink transmission.

In some aspects of the present disclosure, another method for wireless communication is disclosed, the method being performed at a network entity, the method may include determining a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream and a DM-RS for the private stream, generating, based on the DM-RS configuration, a downlink control information (DCI) indicating the downlink transmission, transmitting, to a user equipment (UE), the DCI, generating, based on the DM-RS configuration, the downlink transmission, and transmitting, to the UE, the downlink transmission.

In some aspects of the present disclosure, an apparatus for wireless communication is disclosed, the apparatus may comprise a memory and one or more processors coupled to the memory, the memory and the one or more processors being configured to receive, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream, determine, based on the DCI, a DM-RS configuration for the DM-RS for the common stream and for the DM-RS for the private stream, and receive, based on the DM-RS configuration, the downlink transmission.

In some aspects of the present disclosure, another apparatus for wireless communication is disclosed, the apparatus may comprise a memory and one or more processors coupled to the memory, the memory and the one or more processors being configured to determine a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream and a DM-RS for the private stream, generate, based on the DM-RS configuration, a downlink control information (DCI) indicating the downlink transmission, transmit, to a user equipment (UE), the DCI, generate, based on the DM-RS configuration, the downlink transmission, and transmit, to the UE, the downlink transmission.

In some aspects of the present disclosure, an apparatus for wireless communication (e.g., the apparatus configured for use at a first wireless node) is disclosed, the apparatus may comprise means for receiving, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream, means for determining, based on the DCI, a DM-RS configuration for the DM-RS for the common stream and for the DM-RS for the private stream, and means for receiving, based on the DM-RS configuration, the downlink transmission.

In some aspects of the present disclosure, another apparatus for wireless communication (e.g., the apparatus configured for use at a second wireless node) is disclosed, the apparatus may comprise means for determining a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream and a DM-RS for the private stream, means for generating, based on the DM-RS configuration, a downlink control information (DCI) indicating the downlink transmission, means for transmitting, to a user equipment (UE), the DCI, means for generating, based on the DM-RS configuration, the downlink transmission, and means for transmitting, to the UE, the downlink transmission.

In some aspects of the present disclosure a non-transitory computer-readable medium storing one or more instructions for wireless communication is disclosed. The one or more instructions, when executed by one or more processors, may cause the one or more processors to receive, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream, determine, based on the DCI, a DM-RS configuration for the DM-RS for the common stream and for the DM-RS for the private stream, and receive, based on the DM-RS configuration, the downlink transmission.

In some aspects of the present disclosure a non-transitory computer-readable medium storing one or more instructions for wireless communication is disclosed. The one or more instructions, when executed by one or more processors, may cause the one or more processors to determine a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream and a DM-RS for the private stream, generate, based on the DM-RS configuration, a downlink control information (DCI) indicating the downlink transmission, transmit, to a user equipment (UE), the DCI, generate, based on the DM-RS configuration, the downlink transmission, and transmit, to the UE, the downlink transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5A shows a diagram 500A illustrating configuration type 1 of a demodulation reference signal (DM-RS) in accordance with various aspects of the present disclosure.

FIG. 5B shows a diagram 500B illustrating configuration type 2 of a DM-RS in accordance with various aspects of the present disclosure.

FIG. 6C shows a diagram 600C illustrating various locations of additional DM-RS symbols for a 1-symbol front-loaded DM-RS in accordance with various aspects of the present disclosure.

DETAILED DESCRIPTION

Various aspects of the present disclosure are described in more detail hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the present disclosure to those skilled in the art. Based on the teachings herein one skilled in the art should appreciate that the scope of the present disclosure is intended to cover any aspect of the present disclosure disclosed herein, whether implemented independently of or combined with any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect of the present disclosure disclosed herein may be implemented by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies and Open RAN (O-RAN) technologies.

Figure 1:
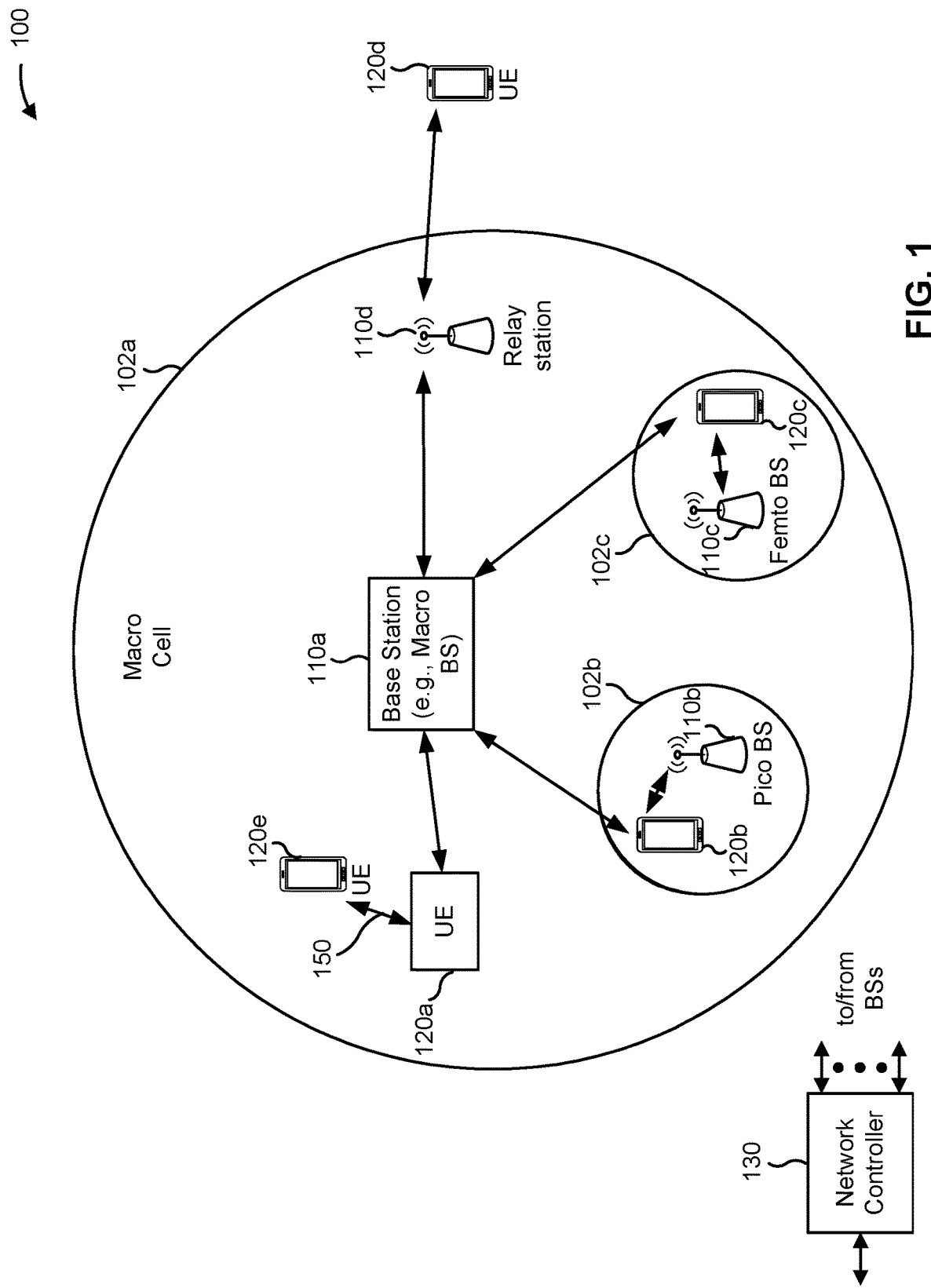
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network, a 5G or NR network, and/or the like. Wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to one or more (e.g., a set of) BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e, and/or the like) may be dispersed throughout wireless network 100, and each UE may be stationary or mobile. A UE may communicate with one or more BSs in wireless network 100, may communicate directly with another UE (e.g., UE 120a and UE 120e, as illustrated in FIG. 1) via a sidelink (e.g., link 150 shown in FIG. 1 as connecting UE 120a and UE 120e), and/or the like.

In some cases, two or more subordinate entities (e.g., UEs) may communicate with each other using sidelink signals. Real-world applications of such sidelink communications may include public safety, proximity services, UE-to-network relaying, vehicle-to-everything (V2X) communications, Internet of Everything (IoE) communications, Internet-of-Things (IoT) communications, mission-critical mesh, and/or various other suitable applications. Generally, a sidelink signal may refer to a signal communicated from one subordinate entity (e.g., UE1) to another subordinate entity (e.g., UE2) without relaying that communication through a scheduling entity (e.g., UE or BS), even though the scheduling entity may be utilized for scheduling and/or control purposes. In some examples, the sidelink signals may be communicated using a licensed spectrum (unlike wireless local area networks, which may use an unlicensed spectrum).

A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered as machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node (e.g., UE, BS, or the like) may provide, for example, connectivity for or to a network (e.g., a wide area network such as Internet or a cellular network) via a wired or wireless communication link. Some UEs may be considered as Internet-of-Things (IoT) devices, and/or may be implemented as NB-IoT (narrowband internet of things) devices. Some UEs may be considered as a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As described herein, a wireless node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad, open-ended way. The example above where a UE is configured to receive information from a base station also discloses that a first network node is configured to receive information from a second network node, where the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, when the first network node is configured to transmit information to the second network node, the first network node may be configured to provide, send, output, communicate, or transmit information to the second network node. Similarly, in this example and consistent with this disclosure, when the first network node is configured to transmit information to the second network node, the second network node may be configured to receive, obtain, or decode the information that is provided, sent, output, communicated, or transmitted by the first network node.

As indicated above, FIG. 1 is provided merely as an example. Other examples may differ from what is described with regard to FIG. 1.

Figure 2:
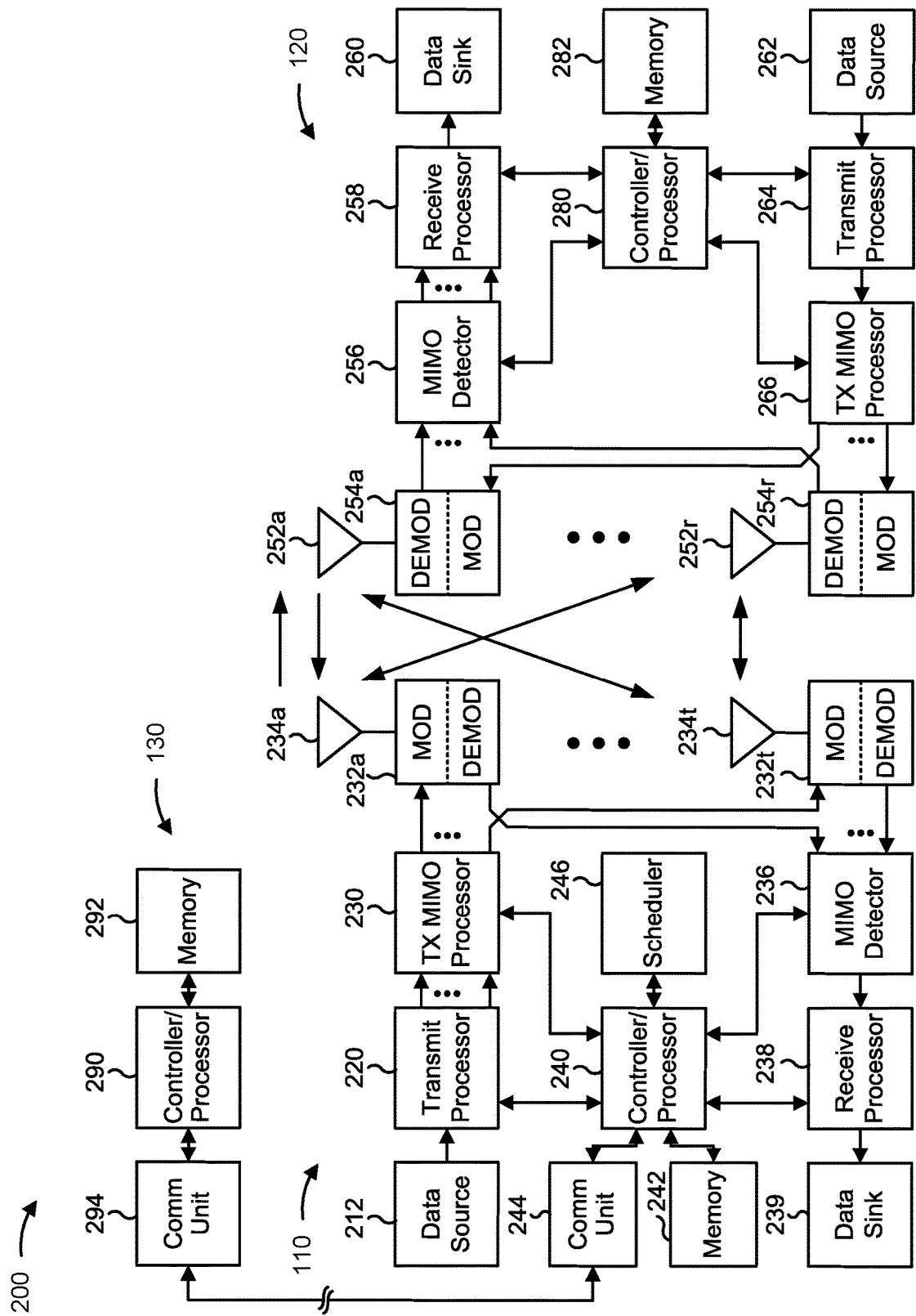
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110, UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 (e.g., 232*a* through 232*t*) may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 (e.g., 254a through 254r) may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120a to a data sink 260, and provide decoded control information and system information to a controller/processor 280. A channel processor may identify reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a Tx MIMO processor 266 if applicable, further processed by modulators 254a through 254r (e.g., for DFT-s-OFDM, CP-OFDM, and/or the like), and transmitted to base station 110 on the uplink. At base station 110, the uplink signals from UE 120, and/or other UEs may be received by antennas 234 (e.g., 234a through 234t), processed by demodulators 232, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Transmit processor 220 of the base station 110, receive processor 238 of the base station 110, transmit processor 264 of the UE 120, receive processor 258 of the UE 120, and/or any other component(s) of FIG. 2 may perform one or more techniques associated with encoding and/or decoding, as described in more detail elsewhere herein. For example, transmit processor 220 of the base station 110, receive processor 238 of the base station 110, transmit processor 264 of the UE 120, receive processor 258 of the UE 120, and/or any other component(s) of FIG. 2 may perform or direct operations of, for example, methods of FIG. 4, FIG. 5A, FIG. 5B, FIG. 6A, FIG. 6B, FIG. 6C, FIG. 6D, or FIG. 8, or processes of FIG. 7 or FIG. 9, and/or other methods and processes as described herein. Memories 242 and 282 may store data and program codes for base station 110 and UE 120, respectively. A scheduler 246 may schedule UEs for data transmission on the downlink and/or uplink.

In some aspects, a UE 120 may include means for receiving, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream, means for determining, based on the DCI, a DM-RS configuration for the DM-RS for the common stream and for the DM-RS for the private stream, and means for receiving, based on the DM-RS configuration, the downlink transmission.

In some aspects, a network entity (e.g., base station 110) may include means for determining a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream and a DM-RS for the private stream, means for generating, based on the DM-RS configuration, a downlink control information (DCI) indicating the downlink transmission, means for transmitting, to a user equipment (UE), the DCI, means for generating, based on the DM-RS configuration, the downlink transmission, and means for transmitting, to the UE, the downlink transmission.

As indicated above, FIG. 2 is provided merely as an example. Other examples may differ from what is described with regard to FIG. 2.

Figure 3:
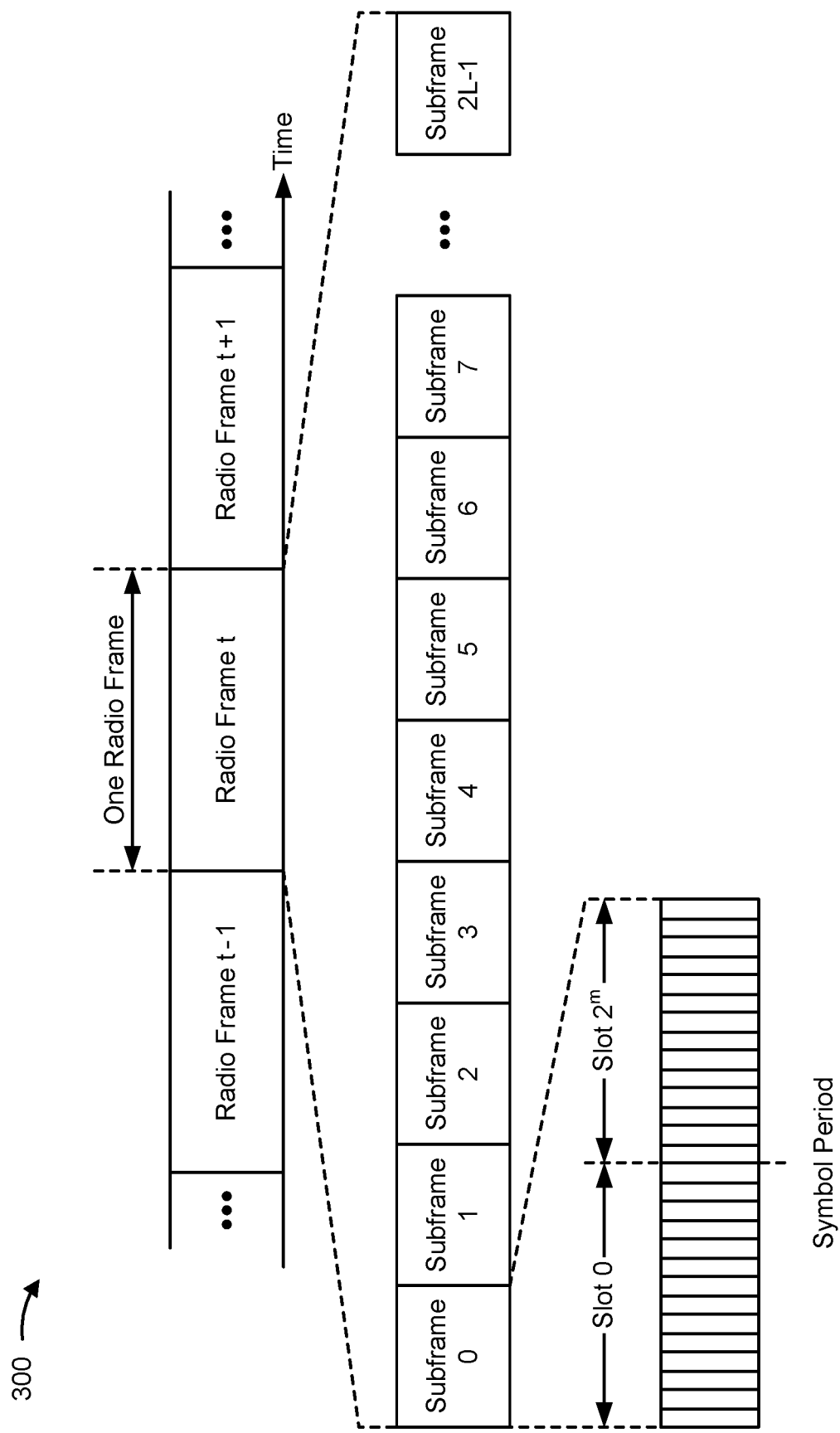
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE, 5G NR, and/or the like). The transmission timeline may be partitioned into units of radio frames, where t represents time. Each radio frame may have a predetermined duration (e.g., 10 milliseconds (ms)) and may be partitioned into a plurality of subframes with indices of 0 through 2L−1. Each subframe may include two slots. As an example, each radio frame may be partitioned into 10 subframes 0 through 9 and 20 slots with indices of 0 through 19. Each slot may include a plurality of symbol periods, such as seven symbol periods for a normal cyclic prefix or six symbol periods for an extended cyclic prefix.

In some aspects, a UE (e.g., UE 120a, and/or the like) may transmit, to another UE (e.g., UE 120a, and/or the like) on a sidelink, one or more sidelink communications in a transmission period, which may include one or more slots included in frame structure 300. In some aspects, the other UE may receive the one or more sidelink communications, may generate feedback for the one or more sidelink communications, may incorporate the feedback into one or more feedback communications, and may transmit, to the UE on the sidelink, the one or more feedback communications in one or more symbols and/or slots included in a reporting period, in frame structure 300, configured for the sidelink.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

As indicated above, FIG. 3 is provided merely as an example. Other examples may differ from what is described with regard to FIG. 3.

In some aspects of the present disclosure, wireless nodes dispersed in the wireless network 100, such as base stations 110 and UEs 120 may use rate-splitting multiple access scheme in conjunction with suitable design of reference signals in order to enhance wireless communication, for example, to achieve a larger degree of freedom and/or a higher capacity.

Figure 4B:
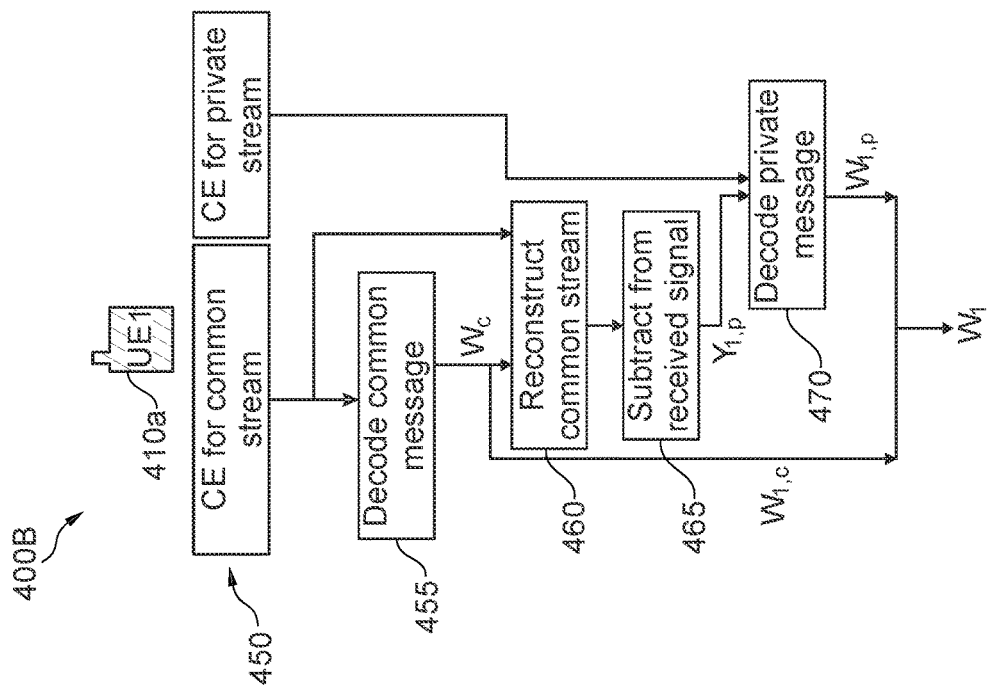
FIG. 4B shows a block diagram illustrating usage of rate-splitting at a user equipment in accordance with various aspect of the present disclosure.
Figure 4A:
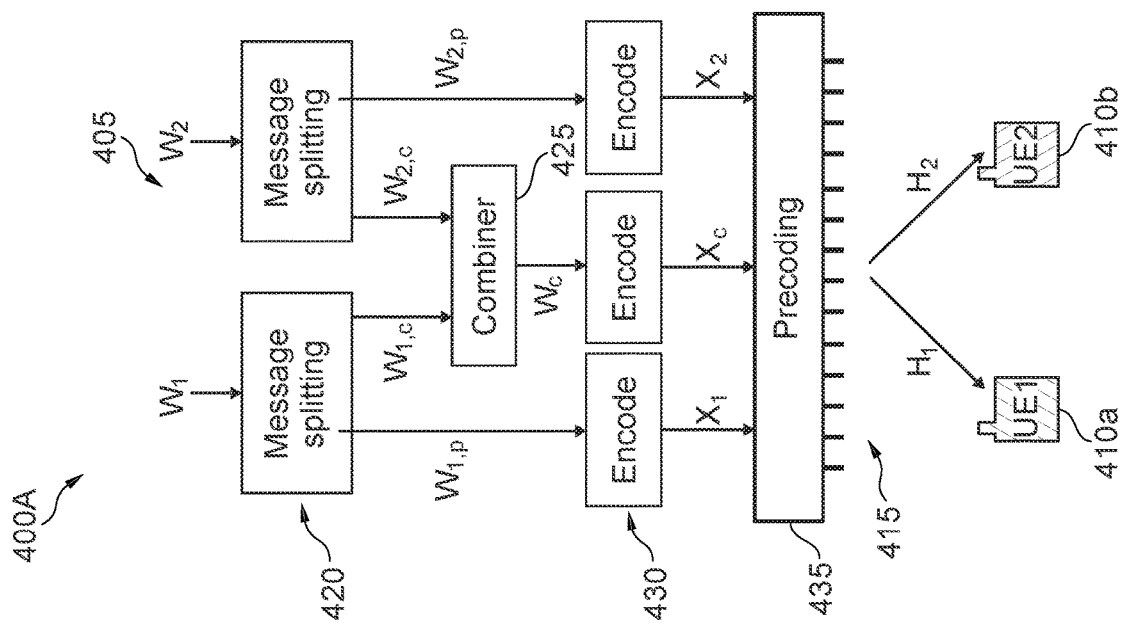
FIG. 4A shows a block diagram illustrating usage of rate-splitting at a base station in accordance with various aspects of the present disclosure.

FIG. 4A shows a block diagram 400A illustrating usage of rate-splitting at a base station in accordance with various aspects of the present disclosure. In some aspects, a base station 405 (e.g., any of BSs 110) may wirelessly communicate with a plurality of individual users such as a UE1 410a (e.g., any of UEs 120) and/or a UE2 410b (e.g., any of UEs 120). More specifically, the base station 405 may intend to wirelessly transmit a message $W_1$ to the UE1 410a and/or a message $W_2$ to the UE 410b. In some aspects, messages $W_1$ and $W_2$ may correspond to respective transport blocks destined for the UE1 410a and the UE 410b and may be processed (and/or provided), for example, at a physical (PHY) layer of a reference model for wireless communication (e.g., an Open Systems Interconnection (OSI) model). The messages $W_1$ and $W_2$ may be obtained from a higher layer, or from a suitable preceding processing stage in the PHY layer, and/or the like. In some aspects, the messages $W_1$ and $W_2$ may correspond to Physical Downlink Shared Channel (PDSCH) for individual UEs (e.g., UE1 410a and UE2 410b), and/or the like. In some aspects, the base station 405 may communicate with the UEs 410a and 410b by using a plurality of antennas 415 (e.g., any of antennas 234a through 234t). In some aspects, the antennas 415 may refer to antennas of one TRP, one gNB and/or the like. In other aspects, the antennas 415 may refer to antennas of multiple TRPs, multiple gNBs and/or the like, for example, in a Coordinated Multi-Point (CoMP) scenario.

In some aspects, for example, at a processing stage 420, the message $W_1$ destined for the UE1 410a may be split into a common part $W_{1,c}$ and a private part $W_{1,p}$, and the message $W_2$ designed for the UE2 410b may be split into a common part $W_{2,c}$ and a private part $W_{2,p}$. The processing stage 420 may be implemented by a portion of transmit processor 220 of base station 110, or any suitable component of base station 110, and/or the like. In some aspects, the designation "common" may refer to the parts $W_{1,c}$ and $W_{2,c}$ undergoing common encoding (see below) and may, for example, not necessitate that content of $W_{1,c}$ and $W_{2,c}$ is the same. In some aspects, the respective common parts $W_{1,c}$ and $W_{2,c}$ of the individual messages $W_1$ and $W_2$ may be subsequently combined (e.g., concatenated) into a common message $W_c$ in a combiner 425. Similar as above, the combiner 425 may be implemented by a portion of transmit processor 220 of base station 110, or any suitable component of base station 110, and/or the like.

In some aspects, for example, at a processing stage 430, each of messages $W_{1,p}$, $W_c$ and $W_{2,p}$ may be separately processed in order to obtain respective streams $X_1$, $X_c$ and $X_2$. For example, processing at the processing stage 430 may include channel coding (e.g., using a low-density parity-check (LDPC) coding scheme and/or the like), rate matching and mapping to a plurality of modulation symbols in accordance with a suitable rate matching and modulation scheme, and/or the like. The skilled person will appreciate that obtaining the streams $X_1$, $X_c$ and $X_2$ may, in some aspects, additionally involve scrambling, interleaving, mapping to one or more layers, and/or the like. Similar as above, the processing stage 430 may be implemented by a portion of transmit processor 220 of base station 110, or any suitable component of base station 110, and/or the like.

In some aspects, for example, in a precoding block 435, each of streams $X_1$, $X_c$ and $X_2$ may be processed (e.g., spatially processed) in order to be mapped to the plurality of antennas 415. In some aspects, processing at the precoding block 435 may involve applying a precoding matrix P1, Pc and P2 to each respective stream $X_1$, $X_c$ and $X_2$ to obtain a (joint) signal $X=P_c X_c + P_1 X_1 + P_2 X_2$ to be transmitted by the base station 405 (e.g., by antennas 415 of the base station 405). The precoding block 435 may be implemented by a portion of Tx MIMO processor 230 of base station 110, or any suitable component of base station 110, and/or the like.

In some aspects, the base station 405 may not signal precoding matrices (e.g., matrices P1, Pc and P2) to the UEs 410a and 410b such that processing applied at the precoding block 435 may be transparent for UEs 410a and 410b. In other words, a channel matrix (which may sometimes be referred to as an effective channel or, for simplicity, a channel) perceived by a UE (e.g., UE1 410a or UE2 410b) may be a product of a respective precoding matrix applied by the base station 405 to an individual stream and an actual wireless channel. For example, a channel for the common stream $X_c$ perceived by the UE1 410a may be expressed as $H_1 P_c$, a channel for its own private stream $X_1$ perceived by the UE1 410a may be expressed as $H_1 P_1$, a channel for the private stream $X_2$ of the UE2 410b perceived by the UE1 410a may be expressed as $H_1 P_2$, where $H_1$ may denote a channel (e.g., actual channel or its estimate) representing properties of a wireless channel between the base station 405 and the UE1 410a. A transmission received by the UE1 410a may be expressed as $Y_1 = H_1 P_c X_c + H_1 P_1 X_1 + H_1 P_2 X_2 + N_1$, where $N_1$ may represent imperfections in the wireless channel, for example, related to the UE1 410a, and may involve channel distortion, multi-path effects, Additive White Gaussian Noise (AWGN), and/or the like. The skilled person will appreciate that corresponding considerations as for the UE1 410a may apply to the UE2 410b, except that the channel between the base station 405 and the UE2 410b may be represented by $H_2$ (instead of $H_1$).

FIG. 4B shows a block diagram 400B illustrating usage of rate-splitting at a user equipment in accordance with various aspect of the present disclosure. In some aspects, the UE1 410a may wirelessly receive the transmission $Y_1$ from the base station 405. In some aspects, for example, at a processing stage 450, the UE1 410a may perform channel estimation (CE) for the common stream (e.g., to obtain the channel $H_1 P_c$) and/or for the private stream (e.g., to obtain the channel $H_1 P_1$). The processing stage 450 may be implemented by a portion of the MIMO detector 256 and/or a portion of the receive processor 258 of the UE 120, or any suitable component of the UE 120, and/or the like. In some aspects, channel estimation may be performed based on a reference signal associated with a respective stream. In some aspects, channel estimation for the common stream may be performed based on a reference signal associated with the common stream (which may also be referred to as a reference signal for the common stream), whereas channel estimation for the private stream may be performed based on a reference signal associated with the private stream (which may also be referred to as a reference signal for the private stream). In some aspects, the reference signal may correspond to Demodulation Reference Signal (DM-RS), for example, DM-RS for PDSCH in 5G/NR, and/or the like. In some aspects, in addition, the transmission received by the UE1 410a (e.g., the transmission $Y_1$) may undergo additional processing at the UE1 410a, for example, processing reversing rate matching, de-mapping bits and modulation symbols, de-scrambling, de-interleaving, reversing layer mapping, and/or the like.

In some aspects, for example, in a processing block 455, the received transmission $Y_1$ may be decoded to obtain the common message $W_c$ including the common part $W_{1,c}$ for the UE1 410a and the common part $W_{2,c}$ for the UE2 410b. In some aspects, the processing block 455 may consider the channel estimate for the common stream (e.g., channel $H_1P_c$) determined at the processing stage 450 in decoding the received transmission $Y_1$ to obtain the common message $W_c$. The processing block 455 may be implemented by a portion of the MIMO detector 256 and/or a portion of the receive processor 258 of the UE 120, or any suitable component of the UE 120, and/or the like. Upon successful decoding, in some aspects, for example, in a processing block 460, the common message $W_c$ may be used to re-construct the common stream $X_c$ in order for it to be subtracted from the received transmission $Y_1$ (see below). For example, the common message $W_c$ may be processed in the processing block 455 of the UE1 410a analogously to processing the common message $W_c$ at the processing stage 430 of the base station 405. The processing block 460 may be implemented by a portion of the MIMO detector 256 and/or a portion of the receive processor 258 of the UE 120, or any suitable component of the UE 120, and/or the like.

In some aspects, for example, in a processing block 465, the re-constructed common stream $X_c$ may be used to subtract a signal representing the common stream (e.g., $H_1P_cX_c$) from the received transmission $Y_1$ to obtain a signal $Y_{1,p}$ to be used decode the private message $W_{1,p}$ (see below). The signal $Y_{1,p}$ may be obtained in the processing block 465 such that $Y_{1,p}=Y_1-H_1P_cX_c$. The skilled person will appreciate that, assuming sufficiently adequate channel estimate $H_1P_c$, the signal $Y_{1,p}$ may be expressed as $Y_{1,p}=H_1P_1X_1+H_1P_2X_2+N_1$ and hence may facilitate obtaining the private message $W_{1,p}$ at the UE1 410a. The processing block 465 may be implemented by a portion of the MIMO detector 256 and/or a portion of the receive processor 258 of the UE 120, or any suitable component of the UE 120, and/or the like. In some aspects, for example, in a processing block 470, the signal $Y_{1,p}$ may be subsequently decoded to obtain the private message $W_{1,p}$ for the UE1 410a. In some aspects, the processing block 470 may consider the channel estimate for the private stream (e.g., channel $H_1P_1$) determined at the processing stage 450 in decoding the signal $Y_{1,p}$ to obtain the message $W_{1,p}$. The processing block 470 may be implemented by a portion of the MIMO detector 256 and/or a portion of the receive processor 258 of the UE 120, or any suitable component of the UE 120, and/or the like.

Upon successful decoding, in some aspects, the private message $W_1$ may be obtained by the UE1 410a by combining (e.g., concatenating) the common part $W_{1,c}$ for the UE1 410a and the private message $W_{1,p}$ for the UE1 410a. The skilled person will appreciate that processing explained in conjunction with blocks 450, 455, 460, 465 and 470 may sometimes be referred to as successive interference cancellation (SIC). Alternatively, processing explained in conjunction with the block 455 may include at least demodulation but may not necessarily include decoding. For example, in some aspects, the common message $W_c$ may not necessarily comprise a common part destined for a certain UE (e.g., UE1 410a). This may apply to various scenarios, including two or more UEs. In such cases, obtaining signal $Y_{1,p}$ as explained above, or jointly demodulating the common stream and private stream may reduce interference and hence facilitate decoding the private message $W_{1,p}$.

The skilled person will appreciate that suitable channel estimate for the common stream (e.g., channel $H_1P_c$) and/or for the private stream (e.g., channel $H_1P_1$) may be expedient for increasing probability of successful decoding the common message $W_c$ and/or its common part $W_{1,c}$ destined for the UE1 410a (e.g., in the processing block 455). In addition, or alternatively, suitable channel estimate for the common stream (e.g., channel $H_1P_c$) may be expedient for re-constructing the common message $W_c$ (e.g., in the processing blocks 460 and 465) in order to perform the SIC. The skilled person will appreciate that suitable design of a reference signal may facilitate obtaining channel estimate for the common stream and/or for the private stream. In some aspects, design of a reference signal (e.g., DM-RS) may relate, for the common stream and/or for the private stream, for example, to configuration of one or more ports (e.g., one or more DM-RS ports), one or more code division multiplexing (CDM) groups, one or more sequences (e.g., a DM-RS sequences) and/or one or more identifiers for initialization of the respective sequences, density and/or location of the reference signal in an orthogonal frequency-division multiplexing (OFDM) resource grid, and/or the like of this reference signal.

As indicated above, FIG. 4A and FIG. 4B are provided merely as examples. Other examples may differ from what is described with regard to FIG. 4A or FIG. 4B.

In some aspects, a separate reference signal such as a separate demodulation reference signal (DM-RS) may be provided by a base station (e.g., base station 405) for a common stream (e.g., common stream $X_c$) and for a private stream (e.g., private stream $X_1$ destined for the UE1 410a), respectively, to facilitate obtaining respective channel estimates (e.g., channel $H_1P_c$ and/or channel $H_1P_1$) at a UE (e.g., UE1 410a).

Figure 5A:
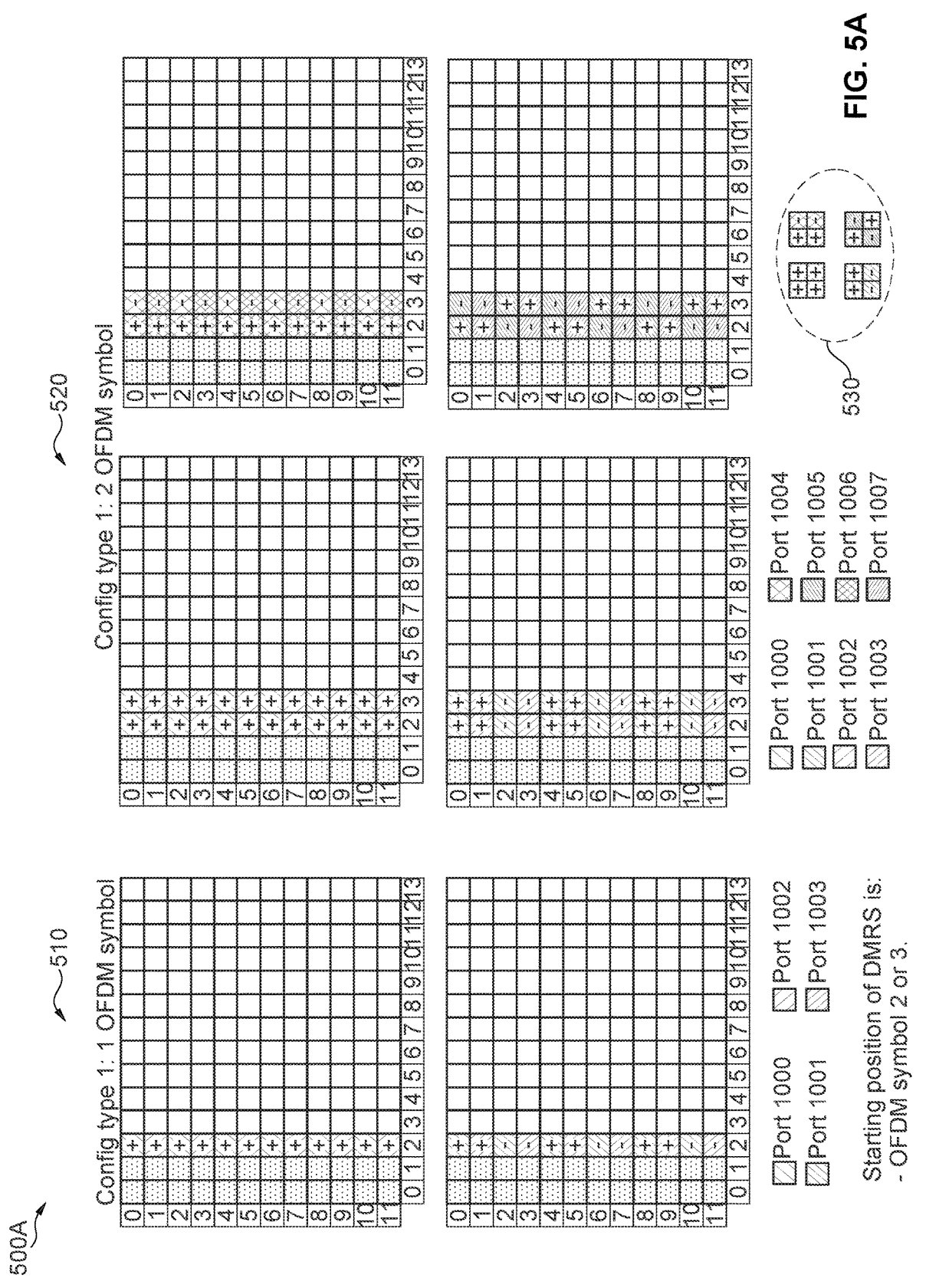

FIG. 5A shows a diagram 500A illustrating configuration type 1 of a demodulation reference signal (DM-RS) in accordance with various aspects of the present disclosure. In some aspects, for example, in 5G/NR and/or the like, two DM-RS patterns may be defined: configuration type 1 (which may also be referred to as Config Type 1) and configuration type 2 (which may also be referred to as Config Type 2). In some aspects, configuration type 1 may relate to mapping a DM-RS port to every other subcarrier in an OFDM symbol. For example, as shown in various diagrams of FIG. 5A, a DM-RS port corresponding to PDSCH port 1000 may be mapped to subcarriers 0, 2, 4, 6, 8 and 10 of a resource block (RB), whereas a DM-RS port corresponding to PDSCH port 1002 may be mapped to subcarriers 1, 3, 5, 7, 9 and 11 of the RB, etc. In some aspects, a DM-RS pattern may comprise one or two OFDM symbols. For example, a configuration type 1 pattern may occupy only one OFDM symbol as shown in diagrams 510, or it may occupy two OFDM symbols as shown in diagrams 520. In some aspects, the only one OFDM symbol (or the two OFDM symbols) carrying DM-RS may be located in the first one (or the first two) OFDM symbols of PDSCH and may be referred to as a front-loaded DM-RS. Alternatively, in some aspects, the only one OFDM symbol (or the two OFDM symbols) carrying DM-RS may be located in the OFDM symbol #2 (or in the OFDM symbols #2 and #3) of a slot, irrespective of location of PDSCH in this slot. In some aspects, in addition to the front-loaded DM-RS, additional symbols comprising DM-RS may be configured (as explained in conjunction with FIG. 6A, FIG. 6B, FIG. 6C and FIG. 6D below).

In some aspects, for example, in 5G/NR and/or the like, antenna ports carrying one or more PDSCHs (and/or DM-RS ports corresponding to respective PDSCHs) may be indicated (directly or indirectly) to a UE (e.g., UE 120, UE1 410a, UE2 410b) by a base station (e.g., base station 110, base station 405) in one or more fields of downlink control information (DCI) scheduling the one or more PDSCHs. In some aspects, for example, in 5G/NR and/or the like, the DCI may be comprised in one or more physical downlink control channels (PDCCHs).

In some aspects, for example in 5G/NR and/or the like, DM-RS ports may be divided into Code Division Multiplexing (CDM) groups. For example, two CDM groups may be defined for configuration type 1, whereas three CDM groups may be defined for configuration type 2 (explained in conjunction with FIG. 5B below). In some aspects, within a CDM group, different DM-RS ports may occupy the same set of resource elements (REs) and may be separated by using different orthogonal cover codes (OCCs). In some aspects, across CDM groups, DM-RS ports may be separated by using frequency division multiplexing (FDM) such that DM-RS REs may be separated in a frequency domain. For example, as shown in diagrams 510, DM-RS ports corresponding to PDSCH ports 1000 and 1001 may form one CDM group, and hence may occupy the same REs and may be separated by different OCCs. Analogous considerations may apply to DM-RS ports corresponding to PDSCH ports 1002 and 1003 forming a second CMD group. Also, for example, as shown in diagrams 520, DM-RS ports corresponding to PDSCH ports 1000, 1001, 1004 and 1005 may form one CDM group, and hence may occupy the same REs and may be separated by different OCCs. Analogous considerations may apply to DM-RS ports corresponding to PDSCH ports 1002, 1003, 1006 and 1007 forming a second CMD group. In some aspects, for example, as illustrated in diagram 530, four DM-RS patterns may be orthogonal in a set of REs comprising 2 by 2 REs (in frequency domain and in time domain, respectively).

In some aspects, for example, in 5G/NR and/or the like, a sequence (e.g., DM-RS sequence) transmitted on a DM-RS port may be determined based on CDM group (e.g., per CDM group). In certain aspects, for example, in 5G/NR Release 15, the same sequence may be used in DM-RS REs of different CDM groups (which may be located in different REs). In other aspects, for example, in 5G/NR Release 16, different sequences may be used in DM-REs of different CDM groups by using a different initialization (e.g., a different pseudo noise (PN) sequence initialization).

Figure 5B:
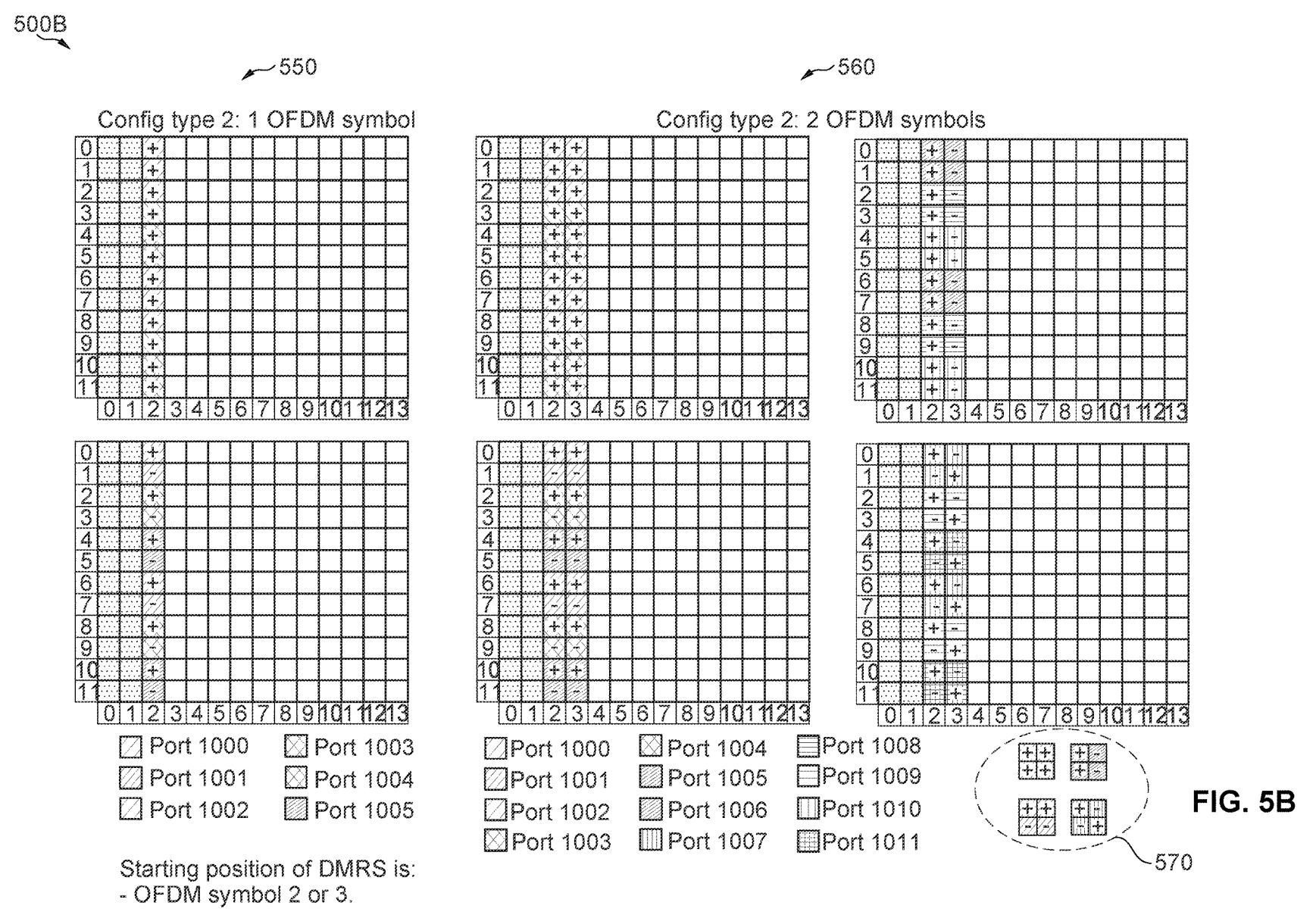

FIG. 5B shows a diagram 500B illustrating configuration type 2 of a demodulation reference signal (DM-RS) in accordance with various aspects of the present disclosure. In some aspects, configuration type 2 may relate to mapping a DM-RS port to two consecutive REs out of a group of six REs (i.e., using a gap of four REs) in an RB. For example, as shown in various diagrams of FIG. 5B, a DM-RS port corresponding to PDSCH port 1000 may be mapped to subcarriers 0, 1, 6 and 7 of an RB, whereas a DM-RS port corresponding to PDSCH port 1002 may be mapped to subcarriers 2, 3, 8 and 9 of the RB and a DM-RS port corresponding to PDSCH port 1004 may be mapped to subcarriers 4, 5, 10 and 11 of the RB, etc. Analogously as in case of configuration type 1 explained in conjunction with FIG. 5A above, in some aspects, a DM-RS pattern of the configuration type 2 may comprise one or two OFDM symbols. For example, a configuration type 2 pattern may occupy only one OFDM symbol as shown in diagrams 550, or it may occupy two OFSM symbols as shown in diagrams 560. In some aspects, the only one OFDM symbol (or the two OFDM symbols) carrying DM-RS may be located in the first one (or the first two) OFDM symbols of PDSCH and may be referred to as a front-loaded DM-RS. Alternatively, in some aspects, the only one OFDM symbol (or the two OFDM symbols) carrying DM-RS may be located in the OFDM symbol #2 (or in the OFDM symbols #2 and #3) of a slot, irrespective of location of PDSCH in this slot. In some aspects, in addition to the front-loaded DM-RS, additional symbols comprising DM-RS may be configured (as explained in conjunction with FIG. 6A, FIG. 6B, FIG. 6C and FIG. 6D below).

In some aspects, for example, in 5G/NR and/or the like, antenna ports carrying one or more PDSCHs (and/or DM-RS ports corresponding to respective PDSCHs) may be indicated (directly or indirectly) to a UE (e.g., UE 120, UE1 410a, UE2 410b) by a base station (e.g., BS 110, base station 405) in one or more fields of downlink control information (DCI) scheduling the one or more PDSCHs. In some aspects, for example, in 5G/NR and/or the like, the DCI may be comprised in one or more physical downlink control channels (PDCCHs).

In some aspects, analogously as in case of configuration type 1, in some aspects, for example in 5G/NR and/or the like, DM-RS ports may be divided into Code Division Multiplexing (CDM) groups. In some aspects, three CDM groups may be defined for configuration type 2. For example, as shown in diagrams 550, DM-RS ports corresponding to PDSCH ports 1000 and 1001 may form one CDM group, and hence may occupy the same REs and may be separated by different OCCs. Analogous considerations may apply to DM-RS ports corresponding to PDSCH ports 1002 and 1003 forming a second CDM group, and to DM-RS ports corresponding to PDSCH ports 1004 and 1005 forming a third CDM group. Also, for example, as shown in diagrams 560, DM-RS ports corresponding to PDSCH ports 1000, 1001, 1006 and 1007 may form one CDM group, and hence may occupy the same REs and may be separated by different OCCs. Analogous considerations may apply to DM-RS ports corresponding to PDSCH ports 1002, 1003, 1008 and 1009 forming a second CDM group, and DM-RS ports corresponding to PDSCH ports 1004, 1005, 1010 and 1011 forming a third CDM group. In some aspects, for example, as illustrated in diagram 570, four DM-RS patterns may be orthogonal in a set of REs comprising 2 by 2 REs (in frequency domain and in time domain, respectively).

In some aspects, analogously as in case of configuration type 1, in some aspects, for example, in 5G/NR and/or the like, a sequence (e.g., DM-RS sequence) transmitted on a DM-RS port may be determined based on CDM group (e.g., per CDM group). In certain aspects, for example, in 5G/NR Release 15, the same sequence may be used in DM-RS REs of different CDM groups (which may be located in different REs). In other aspects, for example, in 5G/NR Release 16, different sequences may be used in DM-REs of different CDM groups by using a different initialization (e.g., a different pseudo noise (PN) sequence initialization). In addition, in some aspects, DM-RS ports corresponding to PDSCH ports 1006-1011 may be scheduled for a UE (e.g., UE1 410a) and co-scheduled UEs (e.g., including UE2 410b) served on the same CDM groups. In such cases, phase tracking reference signal (PT-RS) may not be present for the UE receiving respective PDSCH.

As indicated above, FIG. 5A and FIG. 5B are provided merely as examples. Other examples may differ from what is described with regard to FIG. 5A or FIG. 5B.

Figure 6A:
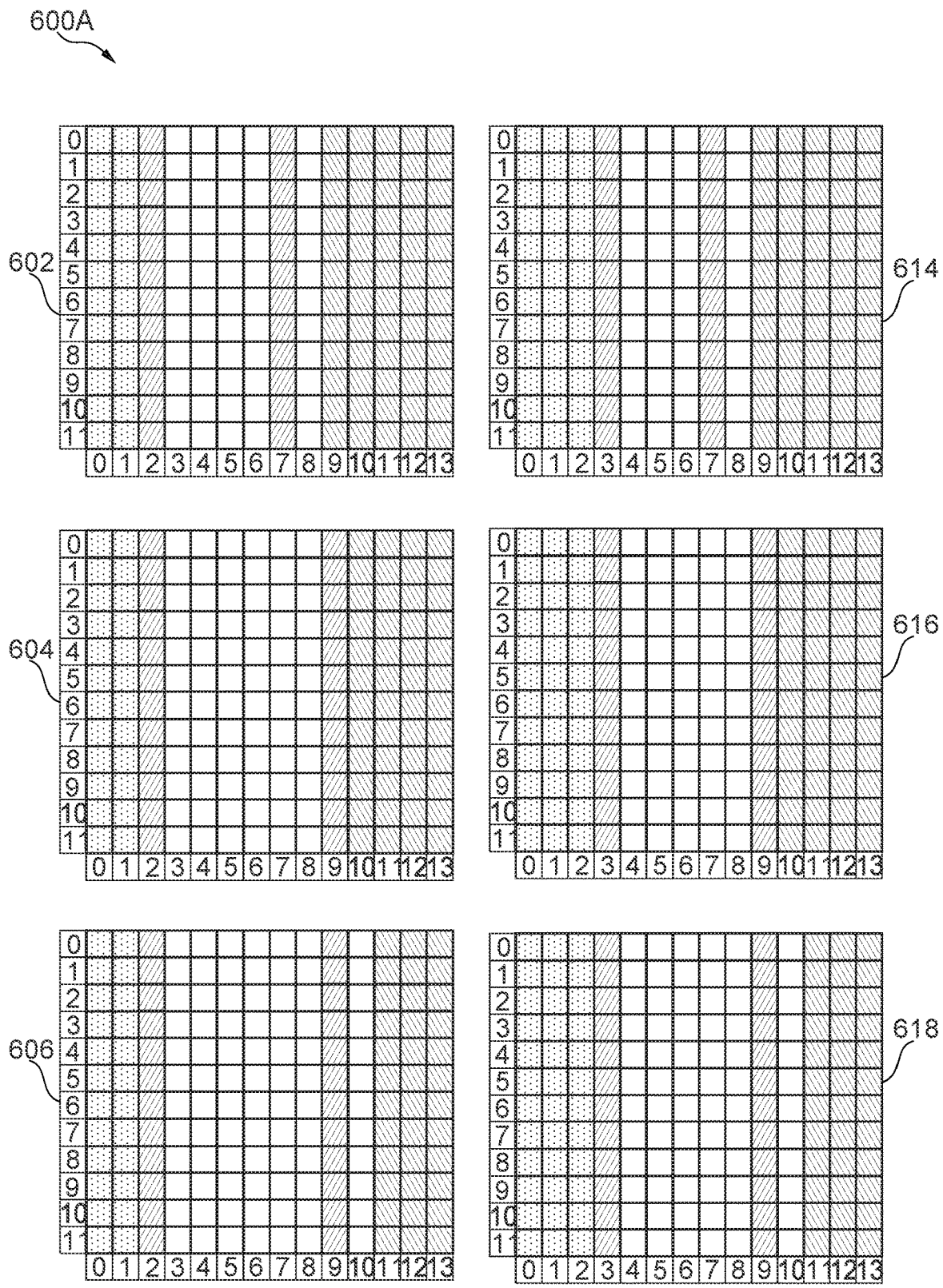
FIG. 6A shows a diagram 600A illustrating various locations of additional DM-RS symbols for a 1-symbol front-loaded DM-RS in accordance with various aspects of the present disclosure.
Figure 6A:
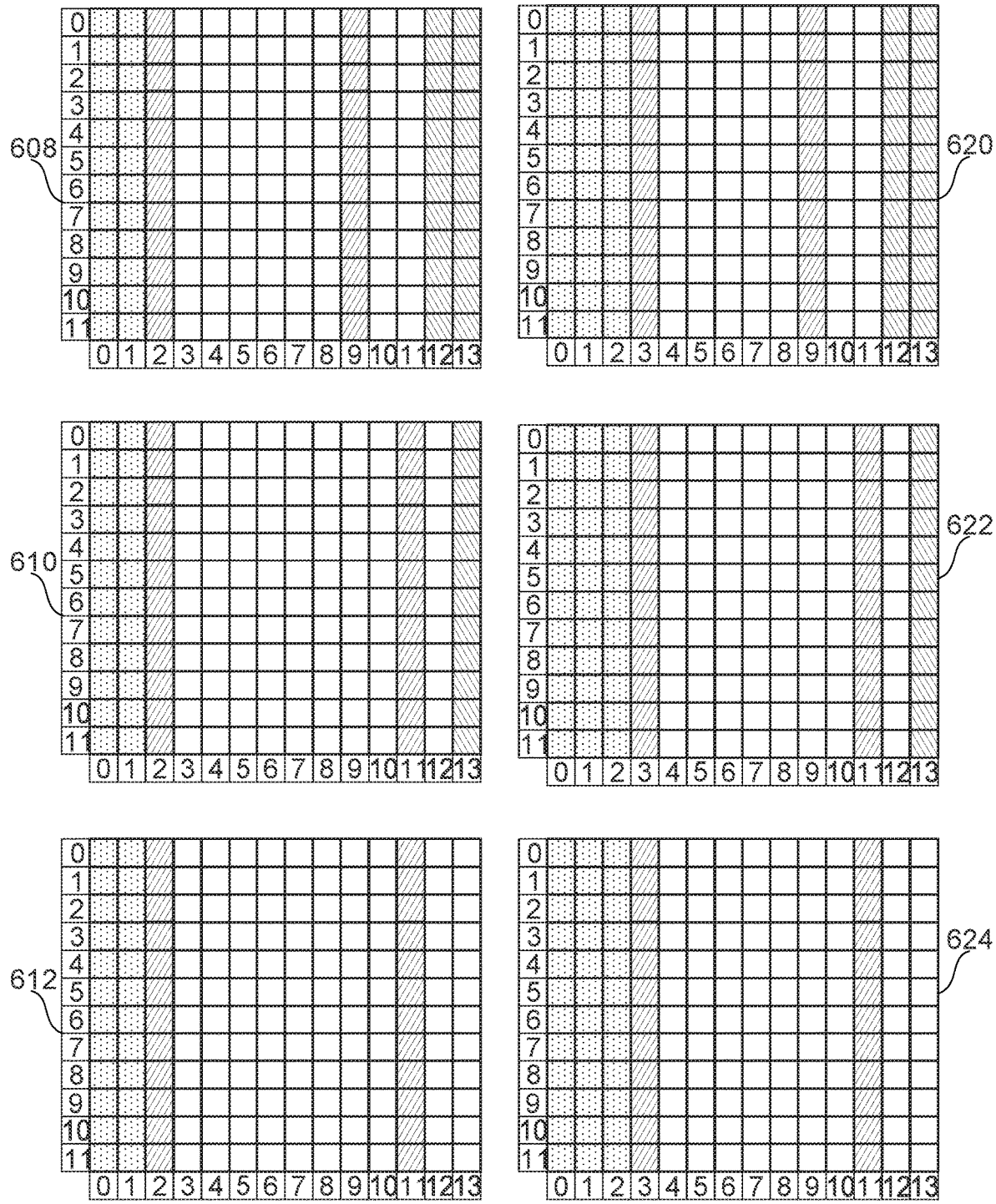

FIG. 6A shows a diagram 600A illustrating various locations of additional DM-RS symbols for a 1-symbol front-loaded DM-RS in accordance with various aspects of the present disclosure. In various examples explained below, within one resource block (RB), for example, in 5G/NR and/or the like, a front-loaded DM-RS may be located in only 1 symbol (e.g., in the first symbol of PDSCH in this RB) and an additional DM-RS may be located in only 1 symbol with varying location. In some aspects, such varying location may depend on configuration and/or a number of symbols in PDSCH. In some aspects, pattern (e.g., allocation to subcarriers and/or CDM groups) and/or ports (e.g., DM-RS ports and/or PDSCH ports) of the additional DM-RS may be the same as the front-loaded DM-RS.

In some aspects, for example, as shown in diagram 602, PDSCH may be scheduled (e.g., by a base station 110, a base station 405, and/or the like) to begin in symbol #2 and to end in symbol #8. In this example, a front-loaded DM-RS may be located in symbol #2 (which is the first symbol of PDSCH) and an additional DM-RS may be located in symbol #7. In another example, as shown in diagram 604, PDSCH may be scheduled to begin in symbol #2 and to end in symbol #9. In this example, a front-loaded DM-RS may be located in symbol #2 and an additional DM-RS may be located in symbol #9. In yet another example, as shown in diagram 606, PDSCH may be scheduled to begin in symbol #2 and to end in symbol #10. In this example, a front-loaded DM-RS may be located in symbol #2 and an additional DM-RS may be located in symbol #9. In yet another example, as shown in diagram 608, PDSCH may be scheduled to begin in symbol #2 and to end in symbol #11. In this example, a front-loaded DM-RS may be located in symbol #2 and an additional DM-RS may be located in symbol #9. In yet another example, as shown in diagram 610, PDSCH may be scheduled to begin in symbol #2 and to end in symbol #12. In this example, a front-loaded DM-RS may be located in symbol #2 and an additional DM-RS may be located in symbol #11. In yet another example, as shown in diagram 612, PDSCH may be scheduled to begin in symbol #2 and to end in symbol #13. In this example, a front-loaded DM-RS may be located in symbol #2 and an additional DM-RS may be located in symbol #11.

In another example, as shown in diagram 614, PDSCH may be scheduled to begin in symbol #3 and to end in symbol #8. In this example, a front-loaded DM-RS may be located in symbol #3 and an additional DM-RS may be located in symbol #7. In yet another example, as shown in diagram 616, PDSCH may be scheduled to begin in symbol #3 and to end in symbol #9. In this example, a front-loaded DM-RS may be located in symbol #3 and an additional DM-RS may be located in symbol #9. In yet another example, as shown in diagram 618, PDSCH may be scheduled to begin in symbol #3 and to end in symbol #10. In this example, a front-loaded DM-RS may be located in symbol #3 and an additional DM-RS may be located in symbol #9. In yet another example, as shown in diagram 620, PDSCH may be scheduled to begin in symbol #3 and to end in symbol #11. In this example, a front-loaded DM-RS may be located in symbol #3 and an additional DM-RS may be located in symbol #9. In yet another example, as shown in diagram 622, PDSCH may be scheduled to begin in symbol #3 and to end in symbol #12. In this example, a front-loaded DM-RS may be located in symbol #3 and an additional DM-RS may be located in symbol #11. In yet another example, as shown in diagram 624, PDSCH may be scheduled to begin in symbol #3 and to end in symbol #13. In this example, a front-loaded DM-RS may be located in symbol #3 and an additional DM-RS may be located in symbol #11.

Figure 6B:
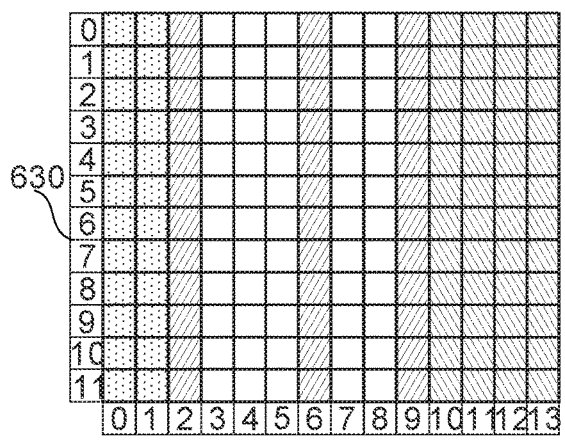
FIG. 6B shows a diagram 600B illustrating various locations of additional DM-RS symbols for a 1-symbol front-loaded DM-RS in accordance with various aspects of the present disclosure.
Figure 6B:
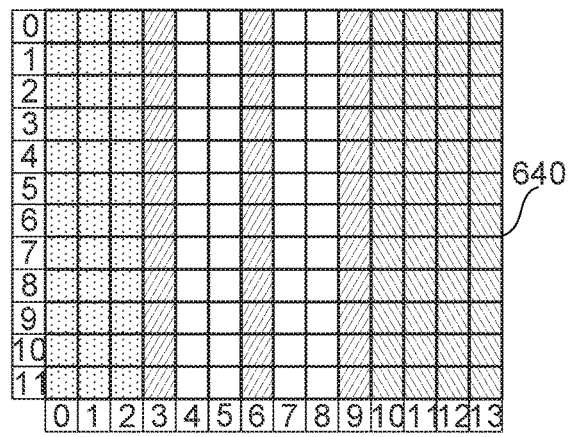
Figure 6B:
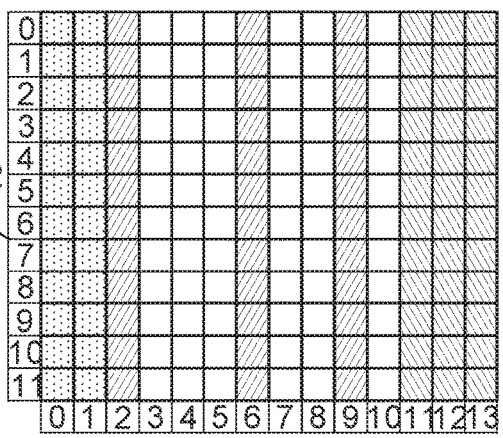
Figure 6B:
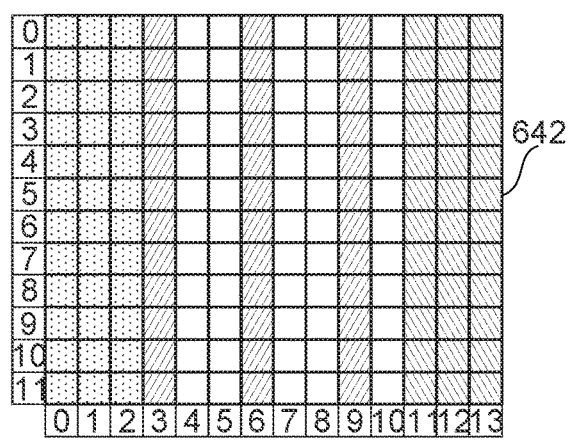
Figure 6B:
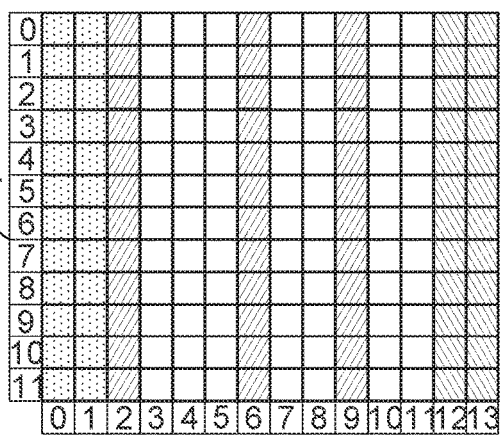
Figure 6B:
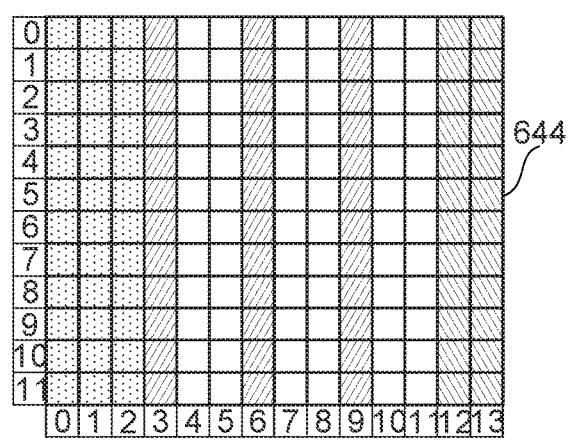
Figure 6B:
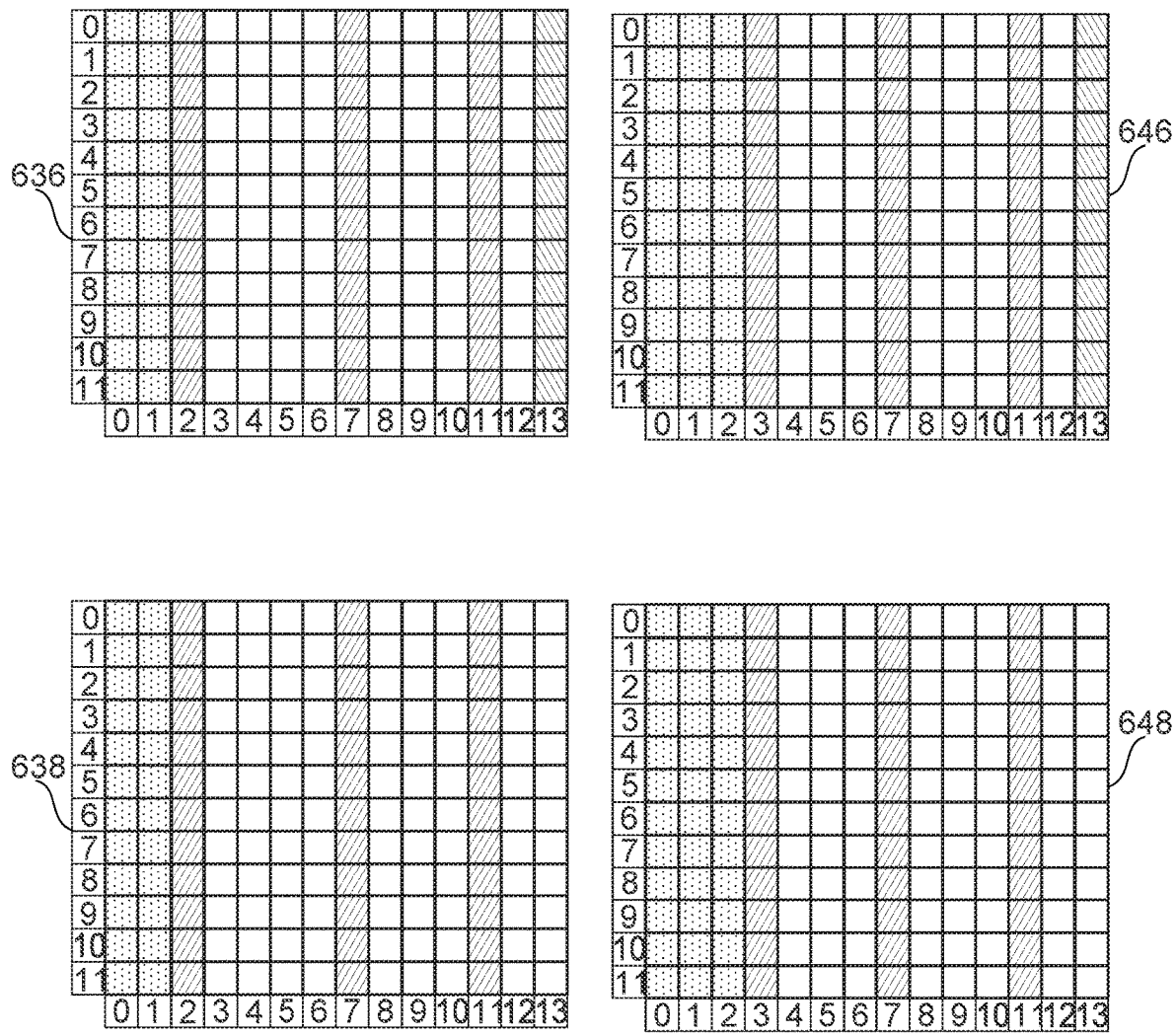

FIG. 6B shows a diagram 600B illustrating various locations of additional DM-RS symbols for a 1-symbol front-loaded DM-RS in accordance with various aspects of the present disclosure. In various examples explained below, within one resource block (RB), for example, in 5G/NR and/or the like, a front-loaded DM-RS may be located in only 1 symbol (e.g., in the first symbol of PDSCH in this RB) and additional DM-RSs may be located in (exactly) 2 symbols with varying locations. In some aspects, such varying locations may depend on configuration and/or a number of symbols in PDSCH. In some aspects, pattern (e.g., allocation to subcarriers and/or CDM groups) and/or ports (e.g., DM-RS ports and/or PDSCH ports) of the additional DM-RS may be the same as the front-loaded DM-RS.

In some aspects, for example, as shown in diagram 630, PDSCH may be scheduled (e.g., by a base station 110, a base station 405, and/or the like) to begin in symbol #2 and to end in symbol #9. In this example, a front-loaded DM-RS may be located in symbol #2 (i.e., in the first symbol of PDSCH) and two additional DM-RSs, each located in one symbol, may be located in symbol #6 and in symbol #9, respectively. In another example, as shown in diagram 632, PDSCH may be scheduled to begin in symbol #2 and to end in symbol #10. In this example, a front-loaded DM-RS may be located in symbol #2 and two additional DM-RSs, each located in one symbol, may be located in symbol #6 and in symbol #9, respectively. In yet another example, as shown in diagram 634, PDSCH may be scheduled to begin in symbol #2 and to end in symbol #11. In this example, a front-loaded DM-RS may be located in symbol #2 and two additional DM-RSs, each located in one symbol, may be located in symbol #6 and in symbol #9, respectively. In yet another example, as shown in diagram 636, PDSCH may be scheduled to begin in symbol #2 and to end in symbol #12. In this example, a front-loaded DM-RS may be located in symbol #2 and two additional DM-RSs, each located in one symbol, may be located in symbol #7 and in symbol #11, respectively. In yet another example, as shown in diagram 638, PDSCH may be scheduled to begin in symbol #2 and to end in symbol #13. In this example, a front-loaded DM-RS may be located in symbol #2 and two additional DM-RSs, each located in one symbol, may be located in symbol #7 and in symbol #11, respectively.

In another example, as shown in diagram 640, PDSCH may be scheduled to begin in symbol #3 and to end in symbol #9. In this example, a front-loaded DM-RS may be located in symbol #3 and two additional DM-RSs, each located in one symbol, may be located in symbol #6 and in symbol #9, respectively. In yet another example, as shown in diagram 642, PDSCH may be scheduled to begin in symbol #3 and to end in symbol #10. In this example, a front-loaded DM-RS may be located in symbol #3 and two additional DM-RSs, each located in one symbol, may be located in symbol #6 and in symbol #9, respectively. In yet another example, as shown in diagram 644, PDSCH may be scheduled to begin in symbol #3 and to end in symbol #11. In this example, a front-loaded DM-RS may be located in symbol #3 and two additional DM-RSs, each located in one symbol, may be located in symbol #6 and in symbol #9, respectively. In yet another example, as shown in diagram 646, PDSCH may be scheduled to begin in symbol #3 and to end in symbol #12. In this example, a front-loaded DM-RS may be located in symbol #3 and two additional DM-RSs, each located in one symbol, may be located in symbol #7 and in symbol #11, respectively. In yet another example, as shown in diagram 648, PDSCH may be scheduled to begin in symbol #3 and to end in symbol #13. In this example, a front-loaded DM-RS may be located in symbol #3 and two additional DM-RSs, each located in one symbol, may be located in symbol #7 and in symbol #11, respectively.

Figure 6C:
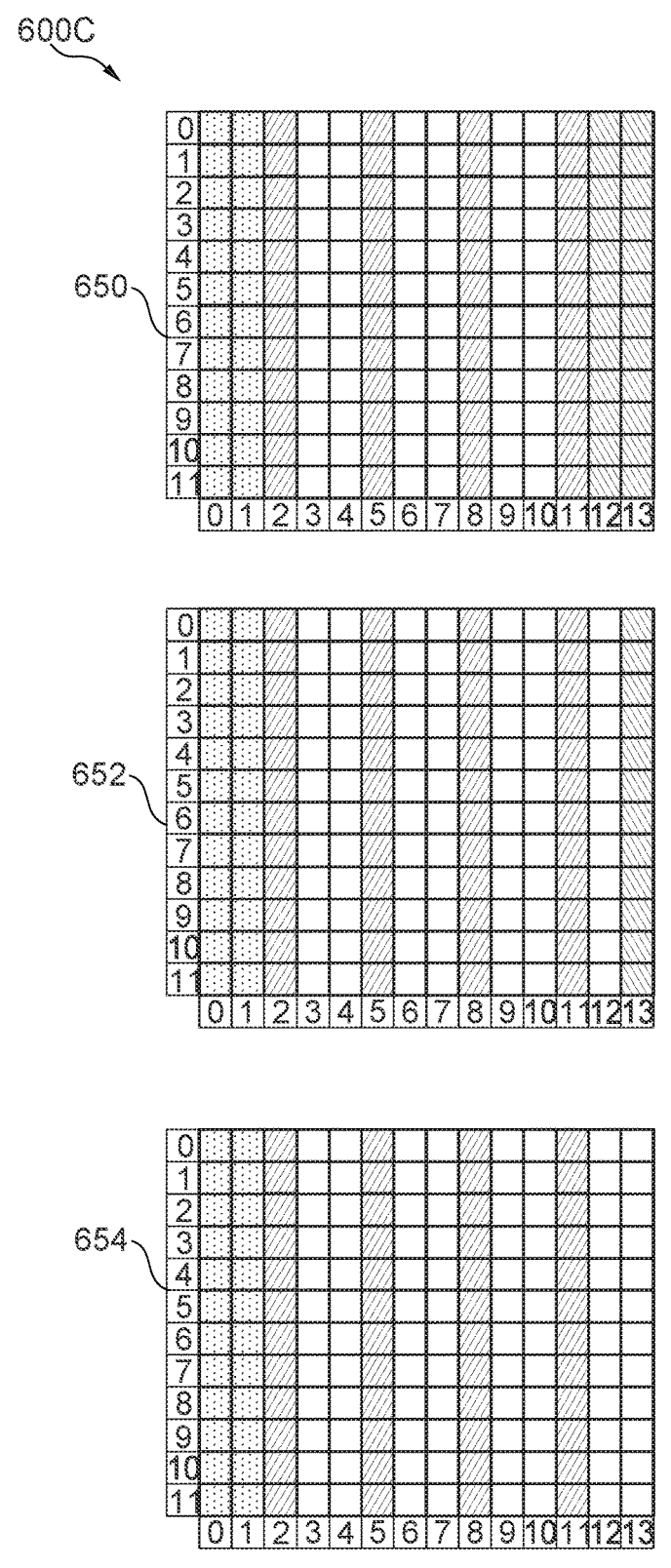

FIG. 6C shows a diagram 600C illustrating various locations of additional DM-RS symbols for a 1-symbol front-loaded DM-RS in accordance with various aspects of the present disclosure. In various examples explained below, within one resource block (RB), for example, in 5G/NR and/or the like, a front-loaded DM-RS may be located in only 1 symbol (e.g., in the first symbol of PDSCH in this RB) and additional DM-RSs may be located in (exactly) 3 symbols with varying locations. In some aspects, such varying locations may depend on configuration and/or a number of symbols in PDSCH. In some aspects, pattern (e.g., allocation to subcarriers and/or CDM groups) and/or ports (e.g., DM-RS ports and/or PDSCH ports) of the additional DM-RS may be the same as the front-loaded DM-RS.

In some aspects, for example, as shown in diagram 650, PDSCH may be scheduled (e.g., by a base station 110, a base station 405, and/or the like) to begin in symbol #2 and to end in symbol #11. In this example, a front-loaded DM-RS may be located in symbol #2 (i.e., in the first symbol of PDSCH) and three additional DM-RSs, each located in one symbol, may be located in symbol #5, in symbol #8 and in symbol #11, respectively. In another example, as shown in diagram 652, PDSCH may be scheduled to begin in symbol #2 and to end in symbol #12. In this example, a front-loaded DM-RS may be located in symbol #2 and three additional DM-RSs, each located in one symbol, may be located in symbol #5, in symbol #8 and in symbol #11, respectively. In yet another example, as shown in diagram 654, PDSCH may be scheduled to begin in symbol #2 and to end in symbol #13. In this example, a front-loaded DM-RS may be located in symbol #2 and three additional DM-RSs, each located in one symbol, may be located in symbol #5, in symbol #8 and in symbol #11, respectively.

Figure 6D:
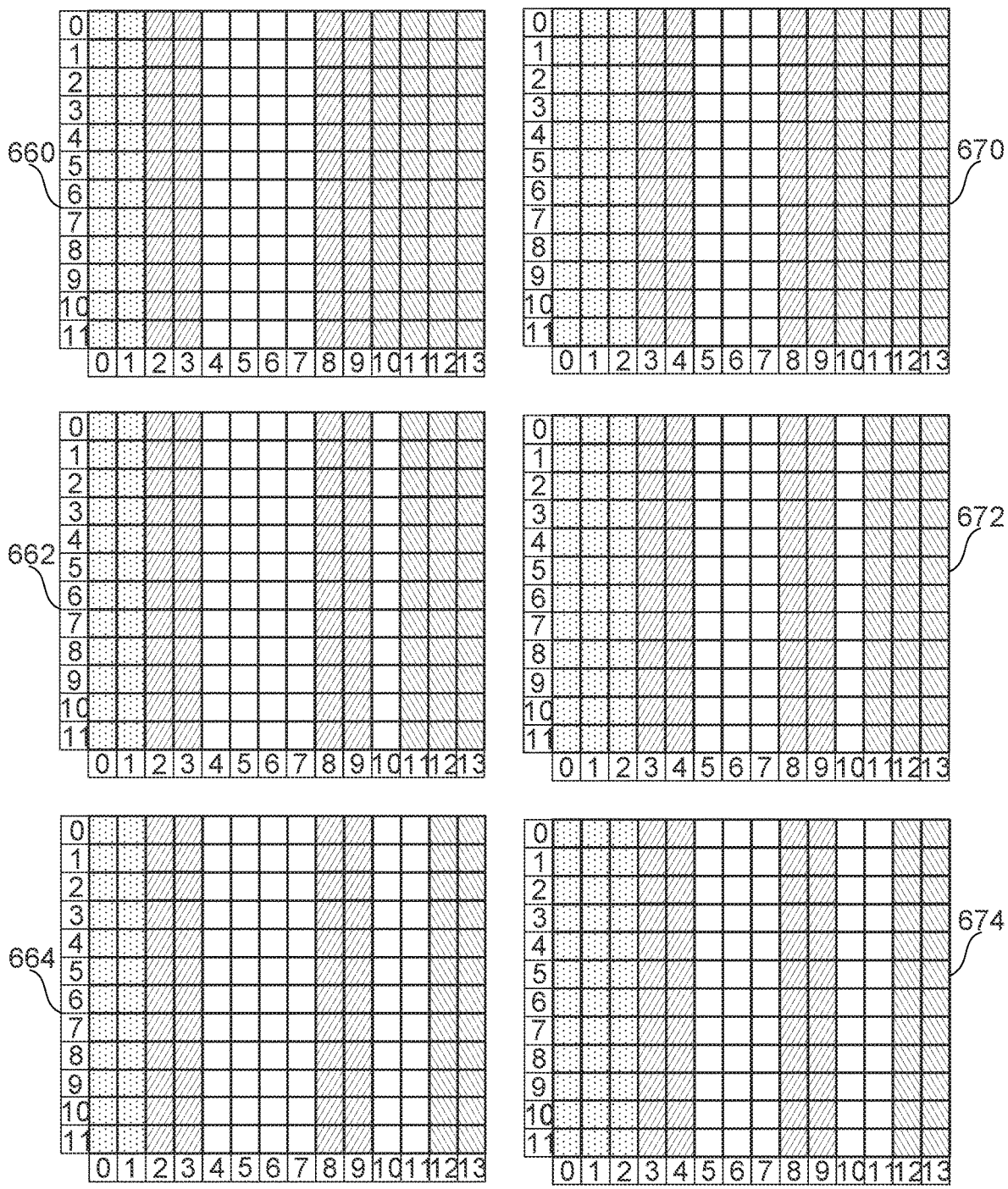
FIG. 6D shows a diagram 600D illustrating various locations of additional DM-RS symbols for a 2-symbol front-loaded DM-RS in accordance with various aspects of the present disclosure.
Figure 6D:
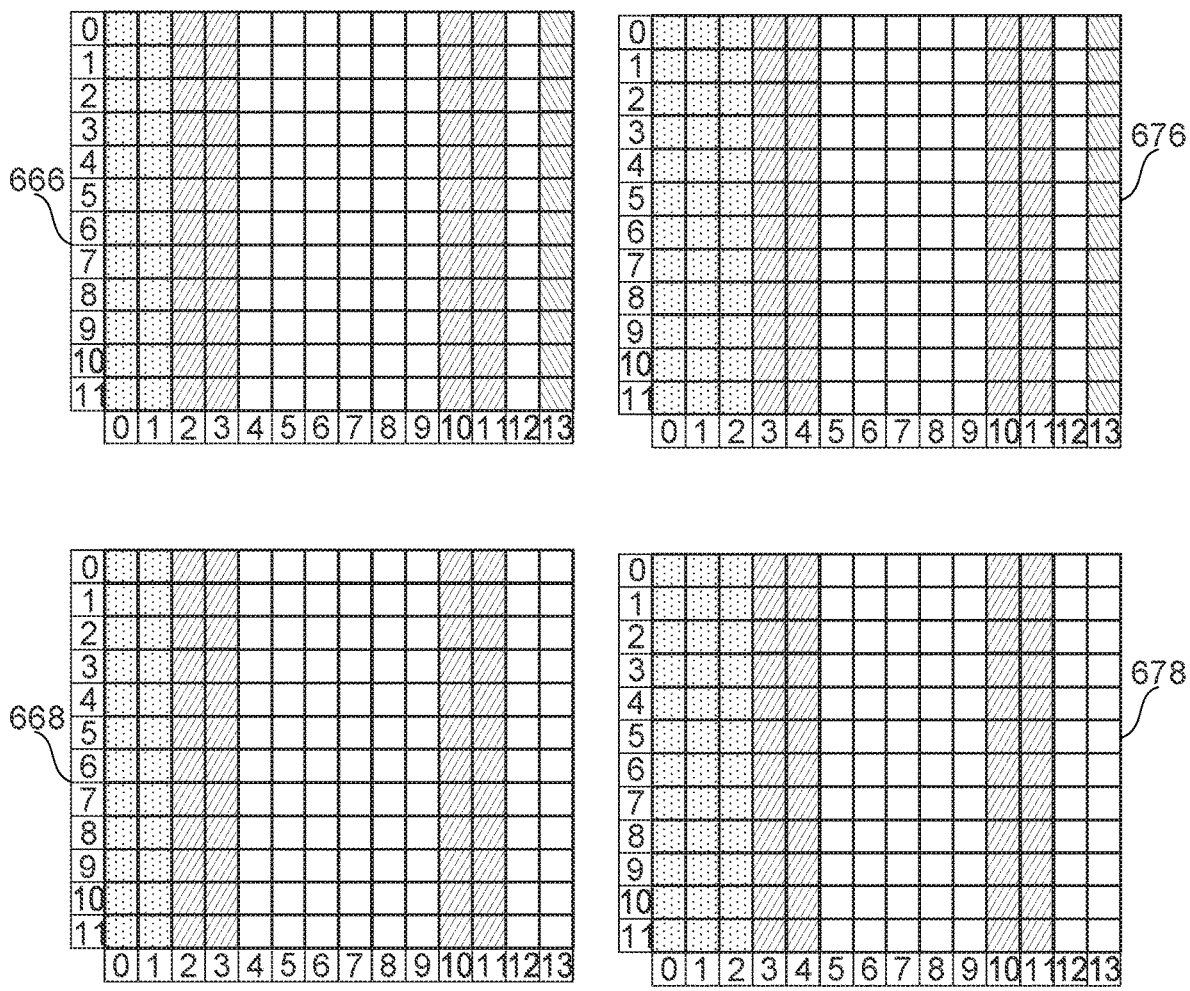

FIG. 6D shows a diagram 600D illustrating various locations of additional DM-RS symbols for a 2-symbol front-loaded DM-RS in accordance with various aspects of the present disclosure. In various examples explained below, within one resource block (RB), for example, in 5G/NR and/or the like, a front-loaded DM-RS may be located in (exactly) 2 symbols (e.g., in the first and second symbol of PDSCH in this RB) and an additional 2-symbol DM-RS may be located in varying 2-symbol locations. In some aspects, such varying locations may depend on configuration and/or a number of symbols in PDSCH. In some aspects, pattern (e.g., allocation to subcarriers and/or CDM groups) and/or ports (e.g., DM-RS ports and/or PDSCH ports) of the additional DM-RS may be the same as the front-loaded DM-RS.

In some aspects, for example, as shown in diagram 660, PDSCH may be scheduled (e.g., by a base station 110, a base station 405, and/or the like) to begin in symbol #2 and to end in symbol #9. In this example, a 2-symbol front-loaded DM-RS may be located in symbols #2 and #3 (i.e., in the first and second symbol of PDSCH) and an additional 2-symbol DM-RS may be located in symbols #8 and #9. In another example, as shown in diagram 662, PDSCH may be scheduled to begin in symbol #2 and to end in symbol #10. In this example, a 2-symbol front-loaded DM-RS may be located in symbols #2 and #3 and an additional 2-symbol DM-RS may be located in symbols #8 and #9. In yet another example, as shown in diagram 664, PDSCH may be scheduled to begin in symbol #2 and to end in symbol #11. In this example, a 2-symbol front-loaded DM-RS may be located in symbols #2 and #3 and an additional 2-symbol DM-RS may be located in symbols #8 and #9. In yet another example, as shown in diagram 666, PDSCH may be scheduled to begin in symbol #2 and to end in symbol #12. In this example, a 2-symbol front-loaded DM-RS may be located in symbols #2 and #3 and an additional 2-symbol DM-RS may be located in symbols #10 and #11. In yet another example, as shown in diagram 668, PDSCH may be scheduled to begin in symbol #2 and to end in symbol #13. In this example, a 2-symbol front-loaded DM-RS may be located in symbols #2 and #3 and an additional 2-symbol DM-RS may be located in symbols #10 and #11.

In another example, as shown in diagram 670, PDSCH may be scheduled to begin in symbol #3 and to end in symbol #9. In this example, a 2-symbol front-loaded DM-RS may be located in symbols #3 and #4 and an additional 2-symbol DM-RS may be located in symbols #8 and #9. In yet another example, as shown in diagram 672, PDSCH may be scheduled to begin in symbol #3 and to end in symbol #10. In this example, a 2-symbol front-loaded DM-RS may be located in symbols #3 and #4 and an additional 2-symbol DM-RS may be located in symbols #8 and #9. In yet another example, as shown in diagram 674, PDSCH may be scheduled to begin in symbol #3 and to end in symbol #11. In this example, a 2-symbol front-loaded DM-RS may be located in symbols #3 and #4 and an additional 2-symbol DM-RS may be located in symbols #8 and #9. In yet another example, as shown in diagram 676, PDSCH may be scheduled to begin in symbol #3 and to end in symbol #12. In this example, a 2-symbol front-loaded DM-RS may be located in symbols #3 and #4 and an additional 2-symbol DM-RS may be located in symbols #10 and #11. In yet another example, as shown in diagram 678, PDSCH may be scheduled to begin in symbol #3 and to end in symbol #13. In this example, a 2-symbol front-loaded DM-RS may be located in symbols #3 and #4 and an additional 2-symbol DM-RS may be located in symbols #10 and #11.

As indicated above, FIG. 6A, FIG. 6B, FIG. 6C and FIG. 6D are provided merely as examples. Other examples may differ from what is described with regard to FIG. 6A, FIG. 6B, FIG. 6C or FIG. 6D.

Based on the above and/or other considerations, the skilled person will appreciate that for rate-spitting multiple access, it may be expedient for a UE to know which DM-RS ports correspond to a common stream and which DM-RS ports correspond to a private stream destined for this UE. In addition, in some aspects, DM-RS ports of a private stream destined for different UEs may be the same. In such cases, a network entity (e.g., base station 110, base station 405, and/or the like) may assign to these DM-RS ports different sequences (e.g., DM-RS sequences). Furthermore, in some aspects, a DM-RS port and a DM-RS sequence for the common stream may be the same for different UEs. In such cases, it may be expedient that (and/or only possible if), for a given UE, a CDM group of one or more DM-RS ports for the common stream is different from the CDM group of one or more DM-RS ports for the private stream.

Moreover, in some aspects, for example in 5G/NR and/or the like, a density of DM-RS in an OFDM grid (e.g., in terms of a number of subcarriers carrying DM-RS, a number of symbols carrying DM-RS, and/or the like) may be the same for all DM-RS ports. Based on the above and/or other considerations, the skilled person will appreciate that, for rate-splitting multiple access, suitable channel estimate for the common stream (e.g., channel $H_1P_c$) may be expedient, for example, decoding and/or reconstructing the common message and/or its portion. In such cases, it may be expedient to design DM-RS to enable different DM-RS density (e.g., in time and/or frequency domain) for different DM-RS, for example, for DM-RS ports associated with the common stream relative to DM-RS ports associated with one or more private streams destined for respective UEs.

Figure 7:
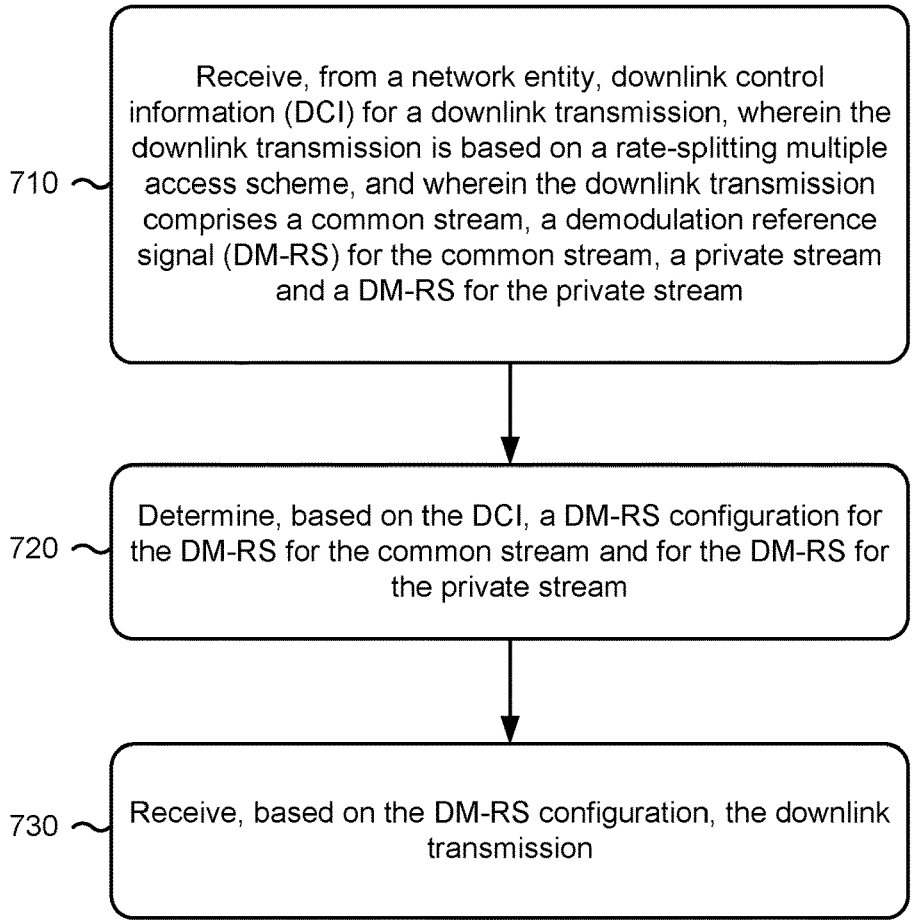
FIG. 7 is a diagram illustrating an example process 700 performed at a user equipment (UE) in accordance with various aspects of the present disclosure.

FIG. 7 is a diagram illustrating an example process 700 performed at a user equipment (UE) in accordance with various aspects of the present disclosure. In some aspects, the UE may comprise (or may be) a UE 120, a UE1 410a, a UE2 410b, and/or the like. In some aspects, process 700 may be implemented by a portion of the MIMO detector 256 and/or a portion of the receive processor 258 of the UE 120, or any suitable component of the UE 120, the UE1 410a, the UE2 410b, and/or the like. In some aspects, process 700 may include additional blocks, fewer blocks, different blocks, or differently arranged blocks than those depicted in FIG. 7. Additionally, or alternatively, two or more of the blocks of process 700 may be performed in parallel.

As shown in FIG. 7, process 700 may include receiving, from a network entity, downlink control information (DCI) for a downlink transmission (block 710). The downlink transmission may be based on a rate-splitting multiple access scheme. The downlink transmission may comprise a common stream, a demodulation reference signal (DM-RS) for the common stream, a private stream and a DM-RS for the private stream. In some aspects, the network entity may comprise a base station 110, a base station 405, and/or the like. In some aspects, the rate-splitting multiple access scheme may comprise (or may be) the rate-splitting described in conjunction with FIG. 4B above and may comprise its individual features. In some aspects, the common stream may comprise (or may be) a jointly encoded stream destined for plural UEs such as a stream $W_c$ described above. In some aspects, the common stream may comprise (or may be) a first PDSCH, a first set of layers of a PDSCH, and/or the like. The DM-RS for the common stream may comprise (or may be) DM-RS associated with the first PDSCH or the first set of layers of the PDSCH. In some aspects, the private stream may comprise (or may be) a stream destined only for the UE performing the example process 700. In some aspects, the private stream may comprise (or may be) a second PDSCH, a second set of layers of the PDSCH, and/or the like. The DM-RS for the private stream may comprise (or may be) DM-RS associated with the second PDSCH or the second set of layers of the PDSCH. In some aspects, the DCI may comprise (or may be) the DCI described in conjunction with FIG. 5A or FIG. 5B above and may comprise its individual features. In some aspects, the DCI may schedule the first PDSCH or the first set of layers of the PDSCH, the second PDSCH or the second set of layers of the PDSCH, and/or the like. The DCI may be comprised in one or more PDCCHs.

As further shown in FIG. 7, in some aspects, process 700 may include determining, based on the DCI, a DM-RS configuration for the DM-RS for the common stream and for the DM-RS for the private stream (block 720). The DM-RS configuration may comprise (or may be equal to) any one or more of the aspects described herein and/or the like which may facilitate receiving the DM-RS for the common stream and/or the DM-RS for the private stream. The respective DM-RS configuration, for the common stream and/or the private stream, may comprise (or may be) one or more DM-RS ports, a code division multiplexing (CDM) group associated with a DM-RS port, a DM-RS sequence, an identifier for initialization of the DM-RS sequence, a density of the DM-RS in an orthogonal frequency-division multiplexing (OFDM) resource grid, and/or the like, or any combination thereof. The determining the DM-RS configuration may refer to any one or more of the activities described herein and/or the like resulting in obtaining a DM-RS configuration.

In addition, as shown in FIG. 7, in some aspects, process 700 may include receiving, based on the DM-RS configuration, the downlink transmission (block 730). In some aspects, the received downlink transmission may be further used in accordance with any one or more of the aspects described herein and/or the like. For example, in some aspects, channel estimate for the common stream (e.g., channel $H_1P_c$) and/or for the private stream (e.g., channel $H_1P_1$) may be determined based on the downlink transmission (e.g., based on the DM-RS for the common stream and/or the DM-RS for the private stream). Furthermore, in some aspects, the channel estimate for the common stream and/or for the private stream may be used decoding, reconstruction, and/or the like as described herein.

In one or more aspects of the present disclosure, in process 700, the DM-RS configuration may comprise (or may be equal to) one or more DM-RS ports for the DM-RS for the common stream, one or more DM-RS ports for the DM-RS for the private stream, or a combination thereof. In such aspects, one or more fields in the DCI may indicate the one or more DM-RS ports for the DM-RS for the common stream, the one or more DM-RS ports for the DM-RS for the private stream, or a combination thereof. For example, the DCI may explicitly indicate the one or more DM-RS ports for the respective DM-RS for the common and/or private stream. In other examples, the DCI may indicate antenna ports associated with the PDSCH (or PDSCHs) and the one or more DM-RS port may be derived from the antenna ports (e.g., based on a 1-to-1 mapping between the DM-RS ports and the antenna ports associated with PDSCH(s), and/or the like). Such signaling scheme may, for example, facilitate flexibility and/or efficient processing at the UE.

In one or more of the above aspects, in process 700, the DM-RS configuration may comprise (or may be equal to) one or more DM-RS ports for the DM-RS for the common stream, one or more DM-RS ports for the DM-RS for the private stream, or a combination thereof. Further, in such aspects, one or more fields in the DCI may indicate a set of DM-RS ports for the downlink transmission, a number of layers for the common stream and a number of layers for the private stream. Furthermore, in such aspects, in process 700, determining the DM-RS configuration may further include determining the one or more DM-RS ports for the DM-RS for the common stream as a first subset of the set of DM-RS ports having a number of elements equal to the number of layers for the common stream, and determining the one or more DM-RS ports for the DM-RS for the private stream as a second subset of the set of DM-RS ports having a number of elements equal to the number of layers for the private stream. For example, the DCI may indicate respective number of layers to be 2 and 3 for the common and private stream, respectively, and may indicate DM-RS ports 0 through 4 (i.e., {0, 1, 2, 3, 4}) to be used for the common and private streams. In such cases, the UE may determine, based on the DCI, DM-RS ports {0, 1} as ports for the DM-RS for the common stream, and DM-RS ports {2, 3, 4} as ports for the DM-RS for the private stream. In other words, the UE may determine first n ports of the indicated set of ports as the ports for the DM-RS for the common stream (where n corresponds to the indicated number of layers for the common stream), and remaining m ports of the indicated set of ports as the ports for the DM-RS for the private stream (where m corresponds to the indicated number of layers for the private stream). Such scheme may, for example, facilitate efficient signaling in terms of overhead and flexibility.

In one or more of the above aspects, in process 700, the DM-RS configuration may comprise (or may be equal to)

one or more DM-RS ports for the DM-RS for the common stream, one or more DM-RS ports for the DM-RS for the private stream, or a combination thereof. Further, in such aspects, first one or more fields in the DCI may indicate a presence of the common stream in the downlink transmission and a set of DM-RS ports for the downlink transmission. Furthermore, in such aspects, in process 700, determining the DM-RS configuration may further include determining, based on the indicated presence of the common stream, a first subset of the set of DM-RS ports as the one or more DM-RS ports for the DM-RS for the common stream, and determining, based on the indicated presence of the common stream, a second subset of the set of DM-RS ports as the one or more DM-RS ports for the DM-RS for the private stream. For example, the DCI may (explicitly or implicitly) indicate the presence of the common stream and a set of DM-RS ports to be $\{0, 2, 3\}$. In such cases, the UE may determine, based on the DCI, DM-RS port $\{0\}$ as port for the DM-RS for the common stream, and DM-RS ports $\{2, 3\}$ as ports for the DM-RS for the private stream. In other words, the UE may determine first n ports (where n corresponds to a number of ports fixed in a standard, a preconfigured number of ports, or a number of ports determined in accordance with a rule—see below) of the indicated set of ports as the ports for the DM-RS for the common stream, and remaining ports of the indicated set of ports as the ports for the DM-RS for the private stream. Such scheme may, for example, facilitate efficient signaling in terms of overhead and flexibility.

In addition, in one or more of the above aspects, in process 700, second one or more fields in the DCI may indicate a number of layers for the downlink transmission. Further, in such aspects, the first subset is further determined based on the number of layers. In some aspects, the second one or more fields in the DCI may be the same as the first one or more fields in the DCI, whereas in other aspects, the second one or more fields in the DCI may be different from the first one or more fields in the DCI, depending on circumstances. In some aspects, for example, the second one or more fields in the DCI may indicate a number of layers for the downlink transmission to be L. In such aspects, the number of the first number of ports of the indicated set of ports may be determined as a function of the indicated number of layers L, for example, as $\lfloor L/2 \rfloor$, where the symbol $\lfloor x \rfloor$ denotes a "floor" operation with respect to x. In some alternatives, the second one or more fields in the DCI may not be present in the DCI and L may denote a number of ports (e.g., DM-RS ports). Such scheme may, for example, facilitate efficient signaling in terms of overhead and flexibility.

In one or more of the above aspects, in process 700, DM-RS configuration may comprise (or may be equal to) one or more DM-RS ports for the DM-RS for the common stream, one or more DM-RS ports for the DM-RS for the private stream, or a combination thereof. Further, in such aspects, one or more fields in the DCI may indicate a set of DM-RS ports for the downlink transmission. Furthermore, in such aspects, in process 700, determining the DM-RS configuration may further include determining, based on the set of the DM-RS ports, a plurality of CDM groups, each CDM group corresponding to an individual DM-RS port in the set of DM-RS ports, determining a first subset of the set of DM-RS ports as the one or more DM-RS ports for the DM-RS for the common stream based on the plurality of CDM groups, and determining a second subset of the set of DM-RS ports as the one or more DM-RS ports for the DM-RS for the private stream based on the plurality of CDM groups. For example, the DCI may indicate a set of DM-RS ports to be $\{0, 1, 2\}$. In such cases, given that—as explained above—DM-RS ports $\{0, 1\}$ may be in a CDM group 0 and DM-RS port $\{2\}$ may be in a CDM group 1, the UE may determine DM-RS port $\{2\}$ as port for the DM-RS for the common stream, and DM-RS ports $\{0, 1\}$ as ports for the DM-RS for the private stream (or streams). Such scheme may facilitate, for example, efficient signaling in terms of overhead and flexibility while DM-RS ports for the common stream for different UEs may be determined to be the same, and/or DM-RS ports for the private streams may be different for different UEs.

In addition, in one or more of the above aspects, in process 700, the first subset of the set of DM-RS ports may be associated with a first CDM group of the plurality of CDM groups, wherein the second subset of the set of DM-RS ports may be associated with a second CDM group of the plurality of CDM groups, and wherein the first CDM group is different from the second CDM group. Such scheme may facilitate, for example, that DM-RS ports (and/or DM-RS sequence) for the common stream may be the same for different UEs, whereas the DM-RS ports for the common stream may still be different than the CDM group of DM-RS ports for the private stream (or streams).

In one or more of the above aspects, in process 700, the DM-RS configuration may comprise (or may be equal to) an identifier for initialization of a DM-RS sequence for the DM-RS for the common stream, an identifier for initialization of a DM-RS sequence for the DM-RS for the private stream, or a combination thereof. Further, in such aspects, the identifier for initialization of the DM-RS sequence for the DM-RS for the common stream may be different from the identifier for initialization of the DM-RS sequence for the DM-RS for the private stream. Such scheme may facilitate, for example, that DM-RS sequence for the common stream may be the same for different UEs, whereas DM-RS sequence for the common stream may still be different than the DM-RS sequence of DM-RS ports for the private stream (or streams).

In one or more of the above aspects, process 700 may further include receiving one or more first identifiers and a second identifier. In such aspects, determining the DM-RS configuration may further comprise determining the identifier for initialization of the DM-RS sequence for the DM-RS for the private stream based on the one or more first identifiers, and determining the identifier for initialization of the DM-RS sequence for the DM-RS for the common stream based on the second identifier. In some aspects, the one or more first identifies and/or the second identifier may be received by using a higher layer signaling such as by using Radio Resource Control (RRC) signaling, and/or the like. In some aspects, the one or more first identifiers may comprise (or may be equal to) $N_{ID}^0$ and/or $N_{ID}^1$ as specified in an existing standard such as 5G/NR, and/or the like. In such aspects, the UE may use the identifiers $N_{ID}^0$ and/or $N_{ID}^1$ to generate the DM-RS sequence for the DM-RS ports associated with the private stream. In some aspects, the second identifier may comprise (or may be equal to) an additional identifier (e.g., a new identifier not defined in existing standards such as 5G/NR) and may be configured to the UE for the common stream. In some aspects, the second identifier may be denoted as $N_{ID}^C$. In such aspects, the UE may determine which DM-RS ports correspond to the common stream (e.g., based on any aspects described herein, and/or the like), and may set $c_{init}$ as a function of $N_{ID}^C$ to generate the DM-RS sequence for the DM-RS ports associated with the common stream. Such scheme may facilitate, for example, that DM-RS sequence for the common stream may be the same for different UEs, whereas DM-RS sequence for the common stream may still be different than the DM-RS sequence of DM-RS ports for the private stream (or streams).

In addition, in one or more of the above aspects, in process 700, determining the identifier for initialization of the DM-RS sequence for the DM-RS for the common stream may be further based on a slot number and one or more symbol numbers of the DM-RS for the common stream. In such aspects, the UE may set $c_{init}$ as a function of $N_{ID}^C$ as well as the slot number and the one or more symbol numbers to generate the DM-RS sequence for the DM-RS ports associated with the common streams. Such scheme may, for example, facilitate diversity and/or reduce interference for DM-RS.

In one or more of the above aspects, process 700 may further include receiving one or more first identifiers. In such aspects, determining the DM-RS configuration may further comprise determining the identifier for initialization of the DM-RS sequence for the DM-RS for the private stream based on the one or more first identifiers and determining that a second identifier has not been received at the UE and in response to the latter: determining the second identifier based on a cell identifier of the network entity and determining the identifier for initialization of the DM-RS sequence for the DM-RS for the common stream based on the second identifier. In such aspects, the one or more first identifies may correspond (or may be equal to) the one or more first identifiers described above and may exhibit one or more of their properties. The second identifier may correspond (or may be equal to) the second identifier described above and may exhibit one or more of its properties. The cell identifier may comprise (or may be equal to) a physical cell identifier such as a physical cell ID of 5G/NR, and/or the like. In some aspects, the UE may determine that it has not received the second identifier (e.g., $N_{ID}^C$). In such cases, the UE may use the cell identifier as the identifier for initialization of the DM-RS sequence for the DM-RS for the common stream, for example, if the cell identifier is different than any of the one or more first identifiers (e.g., $N_{ID}^1$, $N_{ID}^2$, and/or the like). Such scheme may, for example, facilitate diversity and/or reduce interference for DM-RS.

In addition, in one or more of the above aspects, in process 700, determining that the second identifier has not been received at the UE may further comprise determining that the cell identifier of the BS is equal to any of the one or more first identifiers and in response thereto determining the second identifier is further based on an offset value. In such aspects, the UE may use the cell identifier increased by the offset value for the DM-RS sequence initialization for the common stream. In some aspects, the offset value may be a fixed value (e.g., a pre-configured value, a value specified in a standard, and/or the like). In some aspects, the offset value may assume the value of 1. Such scheme may, for example, facilitate that different UEs use the same DM-RS sequence for the common stream in absence of a dedicated identifier for the common stream (e.g., $N_{ID}^C$).

In one or more of the above aspects, in process 700, the DM-RS configuration may comprise (or may be equal to) one or more DM-RS ports, a density of the DM-RS for the common stream in an orthogonal frequency-division multiplexing (OFDM) resource grid, a density of the DM-RS for the private stream in the OFDM resource grid, or any combination thereof. Further, in such aspects, the density of the DM-RS for the common stream in the OFDM resource grid may be a non-constant function of the one or more DM-RS ports, or the density of the DM-RS for the private stream in the OFDM resource grid is a non-constant function of the one or more DM-RS ports, or a combination thereof. In some aspects, the density of the DM-RS in the OFDM resource grid may refer to a density in frequency (e.g., to a number of subcarriers in a symbol or in a resource block (RB) to which the DM-RS is mapped), to a density in time (e.g., a number of symbols in a slot or in an RB to which the DM-RS is mapped), or a combination thereof. In some aspects, the density of the DM-RS in the OFDM resource grid being a non-constant function of the DM-RS ports may refer to the DM-RS density being different for different DM-RS ports. Such scheme may, for example, facilitate a denser DM-RS density for ports associated with the common stream and a sparser DM-RS for ports associated with the private stream.

In one or more of the above aspects, in process 700, the DM-RS configuration may comprise (or may be equal to) a density of the DM-RS for the common stream in an orthogonal frequency-division multiplexing (OFDM) resource grid, a density of the DM-RS for the private stream in the OFDM resource grid, or a combination thereof. Further, in such aspects, the density of the DM-RS for the common stream in the OFDM resource grid in a slot including the downlink transmission may equal to a first number of symbols per slot and the density of the DM-RS for the private stream in the OFDM resource grid in the slot including the downlink transmission may equal to a second number of symbols per slot. In such aspects, the first number may be higher than the second number. The skilled person will recognize that such aspects may comprise, in addition, any of the aspects described in conjunction with FIG. 8A below. For example, as described in more detail in conjunction with FIG. 8A, for a front-loaded DM-RS, the density in the OFDM grid may be the same for all DM-RS ports such as in 5G/NR, and or the like. Also, as described in more detail in conjunction with FIG. 8A, one or more additional DM-RS symbols may include only DM-RS ports associated with the common stream. In some aspects, as described in more detail in conjunction with FIG. 8A, in those additional DM-RS symbols, resource elements (REs) that would map to DM-RS ports of the private stream, may be instead used for PDSCH data.

In one or more of the above aspects, process 700 may further include receiving configuration information. Further, in such aspects, determining the DM-RS configuration may further comprise determining one or more symbol numbers for the DM-RS for the common stream based on the configuration information and determining one or more symbol numbers for the DM-RS for the private stream based on the configuration information. The skilled person will recognize that such aspects may comprise, in addition, any of the aspects described in conjunction with FIG. 8A below. For example, as described in more detail in conjunction with FIG. 8A, the configuration information may indicate a number and one or more positions of additional DM-RS symbols carrying DM-RS ports for both the common stream and the private stream and/or a number and one or more positions of additional DM-RS symbols carrying only DM-RS ports for the common stream.

In one or more of the above aspects, in process 700, determining the DM-RS configuration may further comprise determining one or more symbol numbers for the DM-RS for the common stream based on a duration of physical downlink shared channel (PDSCH) indicated in the DCI, an ending symbol number of the PDSCH indicated in the DCI, a modulation and coding scheme (MCS) for the common stream indicated in the DCI, an MCS for the private stream indicated in the DCI, a number of layers associated with the common stream indicated in the DCI, a number of layers associated with the private stream indicated in the DCI, a number of DM-RS ports associated with the common stream indicated in the DCI or a number of DM-RS ports associated with the private stream indicated in the DCI, or any combination thereof, and determining one or more symbol numbers for the DM-RS for the private stream based on a duration of physical downlink shared channel (PDSCH) indicated in the DCI, an ending symbol number of the PDSCH indicated in the DCI, a modulation and coding scheme (MCS) for the common stream indicated in the DCI, an MCS for the private stream indicated in the DCI, a number of layers associated with the common stream indicated in the DCI, a number of layers associated with the private stream indicated in the DCI, a number of DM-RS ports associated with the common stream indicated in the DCI or a number of DM-RS ports associated with the private stream indicated in the DCI, or any combination thereof. The skilled person will recognize that such aspects may comprise, in addition, any of the aspects described in conjunction with FIG. 8A below. For example, a number and one or more positions of additional DM-RS symbols carrying DM-RS ports for both the common stream and the private stream and/or a number and one or more positions of additional DM-RS symbols carrying only DM-RS ports for the common stream may be a function of a PDSCH duration, a PDSCH ending symbol, MCS of the common stream and/or the private stream, a number of layers and/or DM-RS ports associated with the common and/or private stream, and/or the like.

In one or more of the above aspects, in process 700, the DM-RS configuration may comprise (or may be equal to) a density of the DM-RS for the common stream in an orthogonal frequency-division multiplexing (OFDM) resource grid, a density of the DM-RS for the private stream in the OFDM resource grid, or a combination thereof. Further, in such aspects, the density of the DM-RS for the common stream in the OFDM resource grid may equal to a first number of subcarriers in a frequency domain resource assignment indicated by the DCI and the density of the DM-RS for the private stream in the OFDM resource grid may equal to a second number of subcarriers in the frequency domain resource assignment indicated by the DCI. In such aspects, the first number may be higher than the second number. The skilled person will recognize that such aspects may comprise, in addition, any of the aspects described in conjunction with diagram 850 of FIG. 8 below. For example, as described in more detail in conjunction with diagram 850 of FIG. 8, some DM-RS ports (e.g., for the common stream) may be mapped to a larger number of resource elements (REs), in a given temporal portion such as in a symbol, a slot, and/or the like, than other DM-RS ports (e.g., for the private stream). Further, for example, as described in more detail in conjunction with diagram 850 of FIG. 8, such mapping may be applied to both front-loaded DM-RS symbols as well as to additional DM-RS symbols.

In addition, in one or more of the above aspects, in process 700, the first number of subcarriers in the frequency domain resource assignment may correspond to all subcarriers in the frequency domain resource assignment indicated by the DCI. The skilled person will recognize that such aspects may comprise, in addition, any of the aspects described in conjunction with diagram 850 of FIG. 8 below. For example, as described in more detail in conjunction with diagram 850 of FIG. 8, in both front-loaded DM-RS symbol 855 and/or additional DM-RS symbol 865, all REs may be mapped to one or more DM-RS ports. Such scheme may facilitate, for example, channel estimate for the common stream (e.g., channel $H_1P_c$).

In one or more of the above aspects, in process 700, the DM-RS configuration may comprise (or may be equal to) a density of the DM-RS for the common stream in an orthogonal frequency-division multiplexing (OFDM) resource grid, a density of the DM-RS for the private stream in the OFDM resource grid, or a combination thereof. Further, in such aspects, the density of the DM-RS for the common stream in the OFDM resource grid and the density of the DM-RS for the private stream in the OFDM resource grid is such that one or more symbols of the OFDM resource grid include one or more resource elements only for a subset of DM-RS ports corresponding to the DM-RS for the common stream or to the DM-RS for the private stream. The skilled person will recognize that such aspects may comprise, in addition, any of the aspects described in conjunction with diagram 850 of FIG. 8 below. For example, as described in more detail in conjunction with diagram 850 of FIG. 8, different DM-RS ports may be mapped to different DM-RS symbols such that in one symbol all resource elements (REs) may be mapped to one or more DM-RS ports, but in a neighbor symbol (e.g., next symbol) only a portion of the REs may be mapped to another one or more DM-RS ports. In some aspects, both such symbols may be a part of a front-loaded DM-RS. In other aspects, alternatively or in addition, both such symbols may be a part of additional DM-RS.

In one or more aspects of the present disclosure, as an alternative or in addition to the aspects described above, for instance, in process 700, the UE and/or the network entity may be configured to operate at least in part in accordance with one or more Technical Specifications (TS) produced by a 3rd Generation Partnership Project (3GPP).

Figure 8:
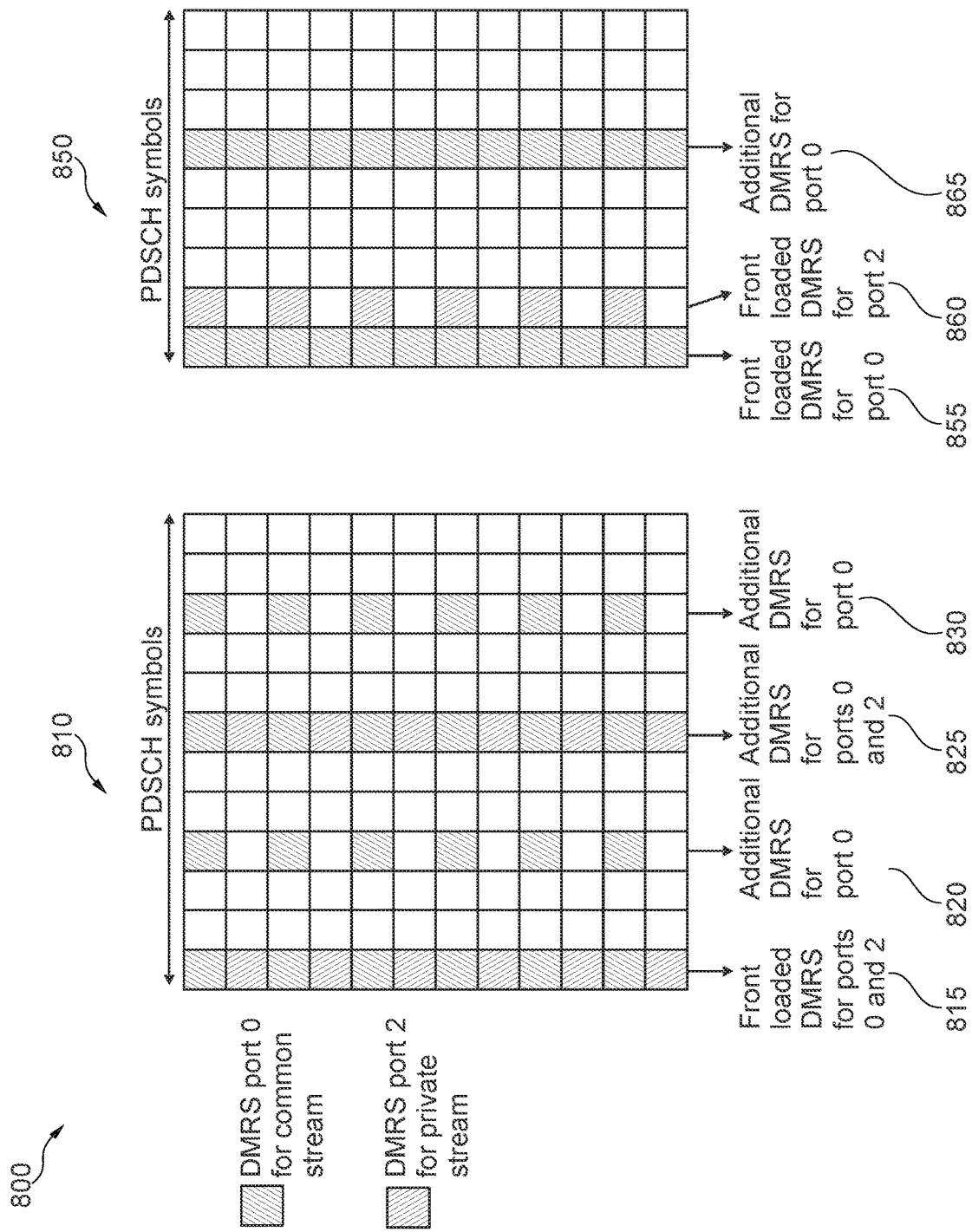
FIG. 8 shows a diagram 800 illustrating different density of DM-RS for different DM-RS ports in accordance with various aspects of the present disclosure.

FIG. 8 shows a diagram 800 illustrating different density of DM-RS for different DM-RS ports in accordance with various aspects of the present disclosure. In some aspects, DM-RS port 0 may be assigned (or may correspond) to a common stream, whereas DM-RS port 2 may be assigned (or may correspond) to a private stream. The common stream and the private stream may correspond to any one or more of the aspects described herein and/or the like.

In one example, a resource grid shown in diagram 810 may correspond to PDSCH spanning across 12 symbols. In some aspects, for a front-loaded DM-RS symbol 815 and an (regular) additional DM-RS symbol 825, the density of resource elements (REs) carrying DM-RS may be the same for all DM-RS ports (e.g., DM-RS port 0 for the common stream and/or DM-RS port 2 for the private stream) and, in some aspects, may be equal to the density as specified in 5G/NR (e.g., in accordance with configuration type 0 described above). In some aspects, one or more (yet) additional DM-RS symbols 820 and 830 may only include DM-RS ports associated with the common stream (e.g., DM-RS port 0), but may not include DM-RS ports associated with the private stream (e.g., DM-RS port 2). In some aspects, REs that do not carry DM-RS in the additional DM-RS symbols 820 and 830 (e.g., REs would map to DM-RS ports for the private stream in a regular additional DM-RS symbol) may be used for PDSCH. The skilled person will appreciate that, in diagram 810, the density of symbols (in time domain) carrying DM-RS for the common stream (e.g., DM-RS port 0) is higher than the density of symbols (in time domain) carrying DM-RS for the private stream (e.g., DM-RS port 2) and hence facilitates advantages described herein and/or the like.

In some aspects, the number and position of additional one or more DM-RS symbols carrying DM-RS ports for both the common stream and the private stream, and/or the number and position of additional one or more DM-RS symbols carrying only one or more DM-RS ports for the common stream may be configured (e.g., indicated to a UE). In addition, in some aspects, such symbols may be a function of a PDSCH duration, a PDSCH ending symbol, modulation and coding scheme (MCS) of the common stream and/or the private stream, a number of layers and/or DM-RS associated with the common stream and/or the private stream, and/or the like, or any combination thereof.

In another example, a resource grid shown in diagram 850 may PDSCH spanning across 9 symbols. In some aspects, certain DM-RS ports (e.g., DM-RS ports for the common stream such as DM-RS port 0) may be mapped to a larger number of REs than other DM-RS ports (e.g., DM-RS ports for the private stream such as DM-RS port 2). Such mapping may apply to both front-loaded DM-RS symbols 855 (e.g., carrying DM-RS port 0 for the common stream) and 860 (e.g., carrying DM-RS port 2 for the private stream) as well as to an additional DM-RS symbol 865 (e.g., carrying DM-RS port 0 for the private stream) and its neighbor symbol in which no REs are used for DM-RS. In some aspects, in one DM-RS symbols (e.g., in front-loaded DM-RS symbol 855 and/or in additional DM-RS symbol 865), all REs may be mapped to one or more DM-RS ports (e.g., to DM-RS port for the common stream such as DM-RS port 0), but in a neighbor DM-RS symbol (e.g., in the next symbol such as in front-loaded DM-RS symbol 860) only a lower number of REs (e.g., half of the REs) is mapped to another one or more DM-RS ports (e.g., to DM-RS port for the private stream such as DM-RS port 2). In some aspects, both the one DM-RS symbol and the neighbor DM-RS symbol may be a part of front-loaded DM-RS, or a part of additional DM-RS).

Figure 9:
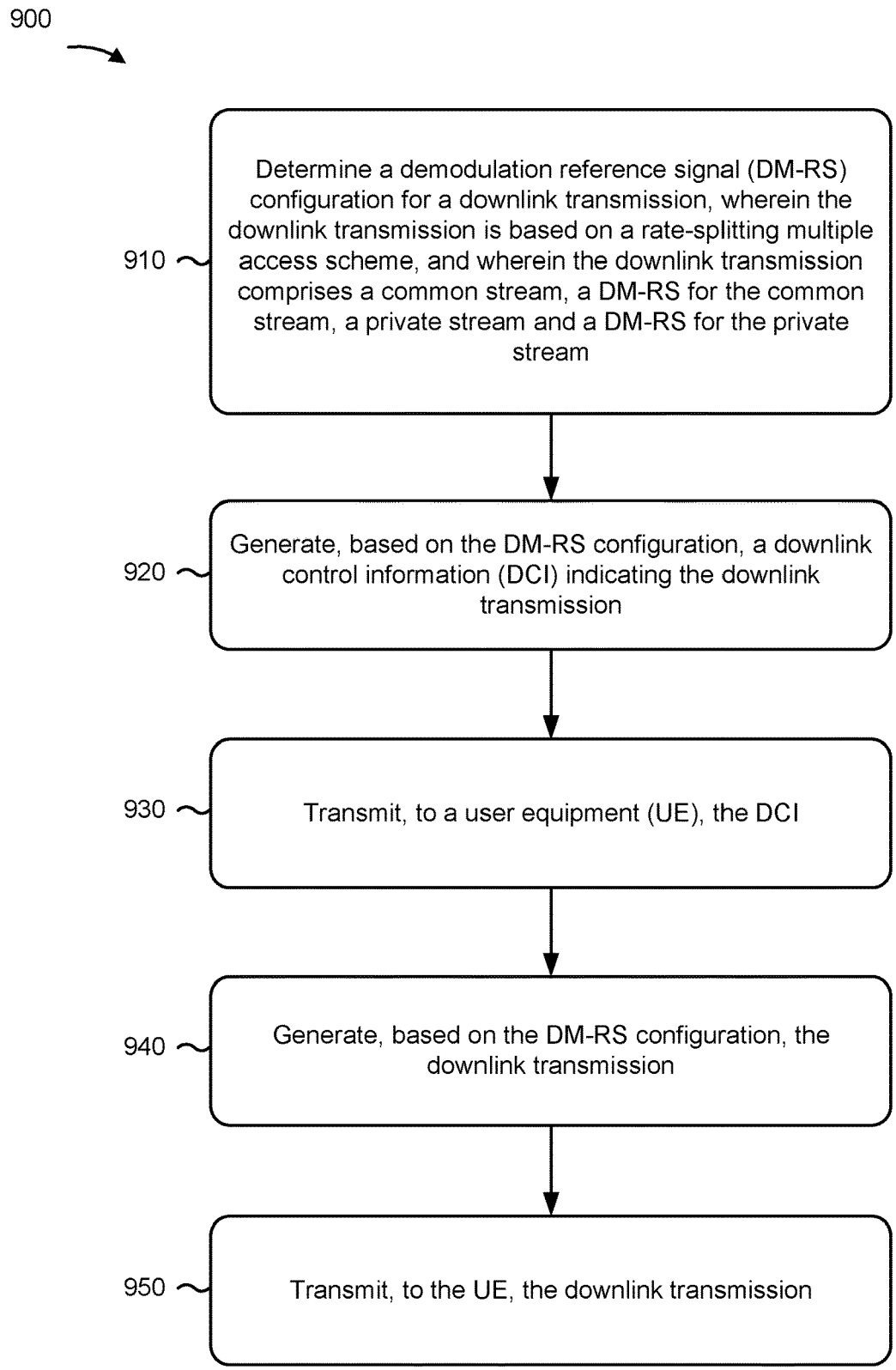
FIG. 9 is a diagram illustrating an example process 900 performed at a network entity in accordance with various aspects of the present disclosure.

FIG. 9 is a diagram illustrating an example process 900 performed at a network entity in accordance with various aspects of the present disclosure. In some aspects, the network entity may comprise (or may be) a base station 110, a base station 405, and or the like. In some aspects, process 900 may be implemented by a portion of transmit processor 220 of base station 110, a portion of Tx MIMO processor 230 of base station 110, or any suitable component of base station 110, and/or the like. In some aspects, process 900 may be implemented by any suitable components of the base station 405 including the processing stage 420, the combiner 425, the processing stage 430, the processing block 435 and the antennas 415. In some aspects, process 900 may include additional blocks, fewer blocks, different blocks, or differently arranged blocks than those depicted in FIG. 9. Additionally, or alternatively, two or more of the blocks of process 900 may be performed in parallel.

As shown in FIG. 9, process 900 may include determining a demodulation reference signal (DM-RS) configuration for a downlink transmission (block 910). The downlink transmission may be based on a rate-splitting multiple access scheme. The downlink transmission comprises a common stream, a DM-RS for the common stream, a private stream and a DM-RS for the private stream. In some aspects, the rate-splitting multiple access scheme may comprise (or may be) the rate-splitting described in conjunction with FIG. 4A above and may comprise its individual features. In some aspects, the common stream may comprise (or may be) a jointly encoded stream destined for plural UEs such as a stream IV, described above. In some aspects, the common stream may comprise (or may be) a first PDSCH, a first set of layers of a PDSCH, and/or the like. The DM-RS for the common stream may comprise (or may be) DM-RS associated with the first PDSCH or the first set of layers of the PDSCH. In some aspects, the private stream may comprise (or may be) a stream destined only for a single UE. In some aspects, the private stream may comprise (or may be) a second PDSCH, a second set of layers of the PDSCH, and/or the like. The DM-RS for the private stream may comprise (or may be) DM-RS associated with the second PDSCH or the second set of layers of the PDSCH. In some aspects, the private stream of process 900 may comprise (or may be) plural private streams destined to plural respective UEs. The DM-RS for the private stream of process 900 may comprise (or may be) plural DM-RSs, each DM-RS for a respective one of the plural private streams. The DM-RS configuration may comprise (or may be equal to) any one or more of the aspects described herein and/or the like which may facilitate transmitting the DM-RS for the common stream and/or the DM-RS for the private stream. The respective DM-RS configuration, for the common stream and/or for the private stream, may comprise (or may be) one or more DM-RS ports, a code division multiplexing (CDM) group associated with a DM-RS port, a DM-RS sequence, an identifier for initialization of the DM-RS sequence, a density of the DM-RS in an orthogonal frequency-division multiplexing (OFDM) resource grid, and/or the like, or any combination thereof. The determining the DM-RS configuration may refer to any one or more of the activities described herein and/or the like resulting in determining a DM-RS configuration.

As further shown in FIG. 9, in some aspects, process 900 may include generating, based on the DM-RS configuration, a downlink control information (DCI) indicating the downlink transmission (block 920). In some aspects, the DCI may comprise (or may be) the DCI described in conjunction with FIG. 5A or FIG. 5B above and may comprise its individual features. In some aspects, the DCI may schedule the first PDSCH or the first set of layers of the PDSCH, the second PDSCH or the second set of layers of the PDSCH, and/or the like. In some aspects, the generating the DCI based on the DM-RS configuration may refer to any one or more of the activities described herein and/or the like resulting in obtaining an DCI such that a UE to which the DCI is destined may be enabled to determine the DM-RS configuration based on the received DCI.

In addition, as shown in FIG. 9, in some aspects, process 900 may include transmitting, to a user equipment (UE), the DCI (block 930). In some aspects, the DCI may be comprised in one or more PDCCHs as descried herein and/or the like.

Moreover, as shown in FIG. 9, in some aspects, process 900 may include generating, based on the DM-RS configuration, the downlink transmission (block 940). In some aspects, the generating may refer to any one or more of the activities described herein with regard to obtaining DM-RS based on the DM-RS configuration, for example, taking into account any one or more aspects of the DM-RS configuration as described herein. Also, as further shown in FIG. 9, in some aspects, process 900 may include transmitting, to the UE, the downlink transmission (block 950).

In one or more aspects of the present disclosure, in process 900, the DM-RS configuration may comprise (or may be equal to) one or more DM-RS ports for the DM-RS for the common stream, one or more DM-RS ports for the DM-RS for the private stream, or a combination thereof. Further, in such aspects, one or more fields in the DCI may indicate the one or more DM-RS ports for the DM-RS for the common stream, the one or more DM-RS ports for the DM-RS for the private stream, or a combination thereof. The description in conjunction with FIG. 7 above with regard to indicating, by one or more fields in the DCI, one or more DM-RS ports applies accordingly.

In one or more of the above aspects, in process 900, the DM-RS configuration may comprise (or may be equal to) the DM-RS configuration comprises one or more DM-RS ports for the DM-RS for the common stream, one or more DM-RS ports for the DM-RS for the private stream, or a combination thereof. Further, in such aspects, one or more fields in the DCI may indicate a set of DM-RS ports for the downlink transmission, a number of layers for the common stream and a number of layers for the private stream, to enable the UE to determine the one or more DM-RS ports for the DM-RS for the common stream as a first subset of the set of DM-RS ports having a number of elements equal to the number of layers for the common stream and to determine the one or more DM-RS ports for the DM-RS for the private stream as a second subset of the set of DM-RS ports having a number of elements equal to the number of layers for the private stream. The description in conjunction with FIG. 7 above with regard to indicating, by one or more fields in the DCI, a set of DM-RS ports and a number of layers applies accordingly.

In one or more of the above aspects, in process 900, the DM-RS configuration may comprise (or may be equal to) one or more DM-RS ports for the DM-RS for the common stream, one or more DM-RS ports for the DM-RS for the private stream, or a combination thereof. Further, in such aspects, one or more fields in the DCI may indicate a set of DM-RS ports for the downlink transmission to enable the UE to determine, based on the set of the DM-RS ports, a plurality of CDM groups, each CDM group corresponding to an individual DM-RS port in the set of DM-RS ports, to determine a first subset of the set of DM-RS ports as the one or more DM-RS ports for the DM-RS for the common stream based on the plurality of CDM groups and to determine a second subset of the set of DM-RS ports as the one or more DM-RS ports for the DM-RS for the private stream based on the plurality of CDM groups. The description in conjunction with FIG. 7 above with regard to indicating, by the DCI, a set of DM-RS ports to enable the UE to determine a plurality of CDM groups, etc. applies accordingly.

In one or more of the above aspects, in process 900, the DM-RS configuration may comprise (or may be equal to) an identifier for initialization of a DM-RS sequence for the DM-RS for the common stream, an identifier for initialization of a DM-RS sequence for the DM-RS for the private stream, or a combination thereof. Further, in such aspects, the identifier for initialization of the DM-RS sequence for the DM-RS for the common stream is different from the identifier for initialization of the DM-RS sequence for the DM-RS for the private stream. The description in conjunction with FIG. 7 above with regard to using different identifiers for initialization of DM-RS sequences applies accordingly.

In addition, in one or more of the above aspects, process 900 may include transmitting one or more first identifiers and a second identifier, to enable the UE to determine the identifier for initialization of the DM-RS sequence for the DM-RS for the private stream based on the one or more first identifiers and to determine the identifier for initialization of the DM-RS sequence for the DM-RS for the common stream based on the second identifier. The description in conjunction with FIG. 7 above with regard to using one or more first identifiers and a second identifier for initialization of DM-RS sequences applies accordingly.

In one or more of the above aspects, in process 900, the DM-RS configuration may comprise (or may be equal to) the DM-RS configuration may comprise a density of the DM-RS for the common stream in an orthogonal frequency-division multiplexing (OFDM) resource grid, a density of the DM-RS for the private stream in the OFDM resource grid, or a combination thereof. Further, in such aspects, the density of the DM-RS for the common stream in the OFDM resource grid may be a non-constant function of the one or more DM-RS ports, or the density of the DM-RS for the private stream in the OFDM resource grid may be a non-constant function of the one or more DM-RS ports, or a combination thereof. The description in conjunction with FIG. 7 above with regard to density of one or more DM-RSs being a function of one or more DM-RS ports applies accordingly.

In one or more of the above aspects, in process 900, the DM-RS configuration may comprise (or may be equal to) a density of the DM-RS for the common stream in an orthogonal frequency-division multiplexing (OFDM) resource grid, a density of the DM-RS for the private stream in the OFDM resource grid, or a combination thereof. Further, in such aspects, the density of the DM-RS for the common stream in the OFDM resource grid in a slot including the downlink transmission may equal to a first number of symbols per slot and the density of the DM-RS for the private stream in the OFDM resource grid in the slot including the downlink transmission may equal to a second number of symbols per slot. Furthermore, in such aspects, the first number may be higher than the second number. The description in conjunction with FIG. 7 above with regard to number of DM-RS symbols per slot applies accordingly.

In one or more of the above aspects, in process 900, the DM-RS configuration may comprise (or may be equal to) a density of the DM-RS for the common stream in an orthogonal frequency-division multiplexing (OFDM) resource grid, a density of the DM-RS for the private stream in the OFDM resource grid, or a combination thereof. Further, in such aspects, the density of the DM-RS for the common stream in the OFDM resource grid may equal to a first number of subcarriers in a frequency domain resource assignment indicated by the DCI and the density of the DM-RS for the private stream in the OFDM resource grid may equal to a second number of subcarriers in the frequency domain resource assignment indicated by the DCI. Furthermore, in such aspects, the first number is higher than the second number. The description in conjunction with FIG. 7 above with regard to number of subcarriers for DM-RS applies accordingly.

In one or more aspects of the present disclosure, as an alternative or in addition to the aspects described above, for instance, in process 700, the UE and/or the network entity may be configured to operate at least in part in accordance with one or more Technical Specifications (TS) produced by 3rd Generation Partnership Project (3GPP). In addition, the skilled person will recognize that any of the aspects described in conjunction with FIG. 7 for a UE may be used, in addition or alternatively, in the aspects described in conjunction with FIG. 9 for a network entity.

In the following, several aspects of the present disclosure are presented:

Aspect 1. A method of wireless communication, the method performed at a user equipment (UE), the method comprising:

receiving, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream;

determining, based on the DCI, a DM-RS configuration for the DM-RS for the common stream and for the DM-RS for the private stream; and receiving, based on the DM-RS configuration, the downlink transmission.

Aspect 2. The method of aspect 1, wherein the DM-RS configuration comprises one or more DM-RS ports for the DM-RS for the common stream, one or more DM-RS ports for the DM-RS for the private stream, or a combination thereof, and wherein one or more fields in the DCI indicate the one or more DM-RS ports for the DM-RS for the common stream, the one or more DM-RS ports for the DM-RS for the private stream, or a combination thereof.

Aspect 3. The method of any one of aspects 1 to 2, wherein the DM-RS configuration comprises one or more DM-RS ports for the DM-RS for the common stream, one or more DM-RS ports for the DM-RS for the private stream, or a combination thereof, and wherein one or more fields in the DCI indicate a set of DM-RS ports for the downlink transmission, a number of layers for the common stream and a number of layers for the private stream, and wherein determining the DM-RS configuration further comprises:

determining the one or more DM-RS ports for the DM-RS for the common stream as a first subset of the set of DM-RS ports having a number of elements equal to the number of layers for the common stream; and determining the one or more DM-RS ports for the DM-RS for the private stream as a second subset of the set of DM-RS ports having a number of elements equal to the number of layers for the private stream.

Aspect 4. The method of any one of aspects 1 to 3, wherein the DM-RS configuration comprises one or more DM-RS ports for the DM-RS for the common stream, one or more DM-RS ports for the DM-RS for the private stream, or a combination thereof, wherein first one or more fields in the DCI indicate a presence of the common stream in the downlink transmission and a set of DM-RS ports for the downlink transmission, and wherein determining the DM-RS configuration further comprises:

determining, based on the indicated presence of the common stream, a first subset of the set of DM-RS ports as the one or more DM-RS ports for the DM-RS for the common stream; and determining, based on the indicated presence of the common stream, a second subset of the set of DM-RS ports as the one or more DM-RS ports for the DM-RS for the private stream.

Aspect 5. The method of any one of aspects 1 to 4, wherein second one or more fields in the DCI indicate a number of layers for the downlink transmission, and the first subset is further determined based on the number of layers.

Aspect 6. The method of any one of aspects 1 to 5, wherein the DM-RS configuration comprises one or more DM-RS ports for the DM-RS for the common stream, one or more DM-RS ports for the DM-RS for the private stream, or a combination thereof, wherein one or more fields in the DCI indicate a set of DM-RS ports for the downlink transmission, and wherein determining the DM-RS configuration further comprises:

determining, based on the set of the DM-RS ports, a plurality of CDM groups, each CDM group corresponding to an individual DM-RS port in the set of DM-RS ports; determining a first subset of the set of DM-RS ports as the one or more DM-RS ports for the DM-RS for the common stream based on the plurality of CDM groups; and determining a second subset of the set of DM-RS ports as the one or more DM-RS ports for the DM-RS for the private stream based on the plurality of CDM groups.

Aspect 7. The method of any one of aspects 1 to 6, wherein the first subset of the set of DM-RS ports is associated with a first CDM group of the plurality of CDM groups, wherein the second subset of the set of DM-RS ports is associated with a second CDM group of the plurality of CDM groups, and wherein the first CDM group is different from the second CDM group.

Aspect 8. The method of any one of aspects 1 to 7, wherein the DM-RS configuration comprises an identifier for initialization of a DM-RS sequence for the DM-RS for the common stream, an identifier for initialization of a DM-RS sequence for the DM-RS for the private stream, or a combination thereof, wherein the identifier for initialization of the DM-RS sequence for the DM-RS for the common stream is different from the identifier for initialization of the DM-RS sequence for the DM-RS for the private stream.

Aspect 9. The method of any one of aspects 1 to 8, the method further comprising:

receiving one or more first identifiers and a second identifier;

and wherein determining the DM-RS configuration further comprises:

determining the identifier for initialization of the DM-RS sequence for the DM-RS for the private stream based on the one or more first identifiers; and determining the identifier for initialization of the DM-RS sequence for the DM-RS for the common stream based on the second identifier.

Aspect 10. The method of any one of aspects 1 to 9, wherein determining the identifier for initialization of the DM-RS sequence for the DM-RS for the common stream is further based on a slot number and one or more symbol numbers of the DM-RS for the common stream.

Aspect 11. The method of any one of aspects 1 to 10, the method further comprising:

receiving one or more first identifiers;

and wherein the determining the DM-RS configuration further comprises:

determining the identifier for initialization of the DM-RS sequence for the DM-RS for the private stream based on the one or more first identifiers; and determining that a second identifier has not been received at the UE and in response thereto:

determining the second identifier based on a cell identifier of the network entity; and determining the identifier for initialization of the DM-RS sequence for the DM-RS for the common stream based on the second identifier.

Aspect 12. The method of any one of aspects 1 to 11, wherein determining that the second identifier has not been received at the UE further comprises:
determining that the cell identifier of the network entity is equal to any of the one or more first identifiers and in response thereto:
determining the second identifier is further based on an offset value.

Aspect 13. The method of any one of aspects 1 to 12, wherein the DM-RS configuration comprises one or more DM-RS ports for the DM-RS for the common stream, one or more DM-RS ports for the DM-RS for the private stream, a density of the DM-RS for the common stream in an orthogonal frequency-division multiplexing (OFDM) resource grid, a density of the DM-RS for the private stream in the OFDM resource grid, or any combination thereof, and wherein the density of the DM-RS for the common stream in the OFDM resource grid is a non-constant function of the one or more DM-RS ports, or the density of the DM-RS for the private stream in the OFDM resource grid is a non-constant function of the one or more DM-RS ports, or a combination thereof.

Aspect 14. The method of any one of aspects 1 to 13, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, wherein the density of the DM-RS for the common stream in the OFDM resource grid in a slot including the downlink transmission equals to a first number of symbols per slot and the density of the DM-RS for the private stream in the OFDM resource grid in the slot including the downlink transmission equals to a second number of symbols per slot, and wherein the first number is higher than the second number.

Aspect 15. The method of any one of aspects 1 to 14, the method further comprising:
receiving configuration information;
and wherein determining the DM-RS configuration further comprises:
determining one or more symbol numbers for the DM-RS for the common stream based on the configuration information; and
determining one or more symbol numbers for the DM-RS for the private stream based on the configuration information.

Aspect 16. The method of any one of aspects 1 to 15, wherein determining the DM-RS configuration further comprises:
determining one or more symbol numbers for the DM-RS for the common stream based on a duration of physical downlink shared channel (PDSCH) indicated in the DCI, an ending symbol number of the PDSCH indicated in the DCI, a modulation and coding scheme (MCS) for the common stream indicated in the DCI, an MCS for the private stream indicated in the DCI, a number of layers associated with the common stream indicated in the DCI, a number of layers associated with the private stream indicated in the DCI, a number of DM-RS ports associated with the common stream indicated in the DCI or a number of DM-RS ports associated with the private stream indicated in the DCI, or any combination thereof; and
determining one or more symbol numbers for the DM-RS for the private stream based on a duration of physical downlink shared channel (PDSCH) indicated in the DCI, an ending symbol number of the PDSCH indicated in the DCI, a modulation and coding scheme (MCS) for the common stream indicated in the DCI, an MCS for the private stream indicated in the DCI, a number of layers associated with the common stream indicated in the DCI, a number of layers associated with the private stream indicated in the DCI, a number of DM-RS ports associated with the common stream indicated in the DCI or a number of DM-RS ports associated with the private stream indicated in the DCI, or any combination thereof.

Aspect 17. The method of any one of aspects 1 to 16, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid equals to a first number of subcarriers in a frequency domain resource assignment indicated by the DCI and the density of the DM-RS for the private stream in the OFDM resource grid equals to a second number of subcarriers in the frequency domain resource assignment indicated by the DCI, and wherein the first number is higher than the second number.

Aspect 18. The method of any one of aspects 1 to 17, wherein the first number corresponds to all subcarriers in the frequency domain resource assignment indicated by the DCI.

Aspect 19. The method of any one of aspects 1 to 18, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid and the density of the DM-RS for the private stream in the OFDM resource grid is such that one or more symbols of the OFDM resource grid include one or more resource elements only for a subset of DM-RS ports corresponding to the DM-RS for the common stream or to the DM-RS for the private stream.

Aspect 20. A method of wireless communication, the method performed at a network entity, the method comprising:
determining a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream and a DM-RS for the private stream; generating, based on the DM-RS configuration, a downlink control information (DCI) indicating the downlink transmission;
transmitting, to a user equipment (UE), the DCI;
generating, based on the DM-RS configuration, the downlink transmission; and
transmitting, to the UE, the downlink transmission.

Aspect 21. The method of aspect 20, wherein the DM-RS configuration comprises one or more DM-RS ports for the DM-RS for the common stream, one or more DM-RS ports for the DM-RS for the private stream, or a combination thereof, and wherein one or more fields in the DCI indicate the one or more DM-RS ports for the DM-RS for the common stream, the one or more DM-RS ports for the DM-RS for the private stream, or a combination thereof.

Aspect 22. The method of any one of aspects 20 to 21 wherein the DM-RS configuration comprises one or more DM-RS ports for the DM-RS for the common stream, one or more DM-RS ports for the DM-RS for the private stream, or a combination thereof, and wherein one or more fields in the DCI indicate a set of DM-RS ports for the downlink transmission, a number of layers for the common stream and a number of layers for the private stream, to enable the UE to determine the one or more DM-RS ports for the DM-RS for the common stream as a first subset of the set of DM-RS ports having a number of elements equal to the number of layers for the common stream and to determine the one or more DM-RS ports for the DM-RS for the private stream as a second subset of the set of DM-RS ports having a number of elements equal to the number of layers for the private stream.

Aspect 23. The method of any one of aspects 20 to 22, wherein the DM-RS configuration comprises one or more DM-RS ports for the DM-RS for the common stream, one or more DM-RS ports for the DM-RS for the private stream, or a combination thereof, wherein one or more fields in the DCI indicate a set of DM-RS ports for the downlink transmission to enable the UE to determine, based on the set of the DM-RS ports, a plurality of CDM groups, each CDM group corresponding to an individual DM-RS port in the set of DM-RS ports, to determine a first subset of the set of DM-RS ports as the one or more DM-RS ports for the DM-RS for the common stream based on the plurality of CDM groups and to determine a second subset of the set of DM-RS ports as the one or more DM-RS ports for the DM-RS for the private stream based on the plurality of CDM groups.

Aspect 24. The method of any one of aspects 20 to 23 the DM-RS configuration comprises an identifier for initialization of a DM-RS sequence for the DM-RS for the common stream, an identifier for initialization of a DM-RS sequence for the DM-RS for the private stream, or a combination thereof, wherein the identifier for initialization of the DM-RS sequence for the DM-RS for the common stream is different from the identifier for initialization of the DM-RS sequence for the DM-RS for the private stream.

Aspect 25. The method of any one of aspects 20 to 24, the method further comprising:
transmitting one or more first identifiers and a second identifier, to enable the UE to determine the identifier for initialization of the DM-RS sequence for the DM-RS for the private stream based on the one or more first identifiers and to determine the identifier for initialization of the DM-RS sequence for the DM-RS for the common stream based on the second identifier.

Aspect 26. The method of any one of aspects 20 to 25, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid is a non-constant function of the one or more DM-RS ports, or the density of the DM-RS for the private stream in the OFDM resource grid is a non-constant function of the one or more DM-RS ports, or a combination thereof.

Aspect 27. The method of any one of aspects 20 to 26, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid in a slot including the downlink transmission equals to a first number of symbols per slot and the density of the DM-RS for the private stream in the OFDM resource grid in the slot including the downlink transmission equals to a second number of symbols per slot, and wherein the first number is higher than the second number.

Aspect 28. The method of any one of aspects 20 to 27, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid equals to a first number of subcarriers in a frequency domain resource assignment indicated by the DCI and the density of the DM-RS for the private stream in the OFDM resource grid equals to a second number of subcarriers in the frequency domain resource assignment indicated by the DCI, and wherein the first number is higher than the second number.

Aspect 29. An apparatus for wireless communication, the apparatus comprising:
a memory; and
one or more processors coupled to the memory, the memory and the one or more processors being configured to:
receive, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream;
determine, based on the DCI, a DM-RS configuration for the DM-RS for the common stream and for the DM-RS for the private stream; and
receive, based on the DM-RS configuration, the downlink transmission.

Aspect 30. An apparatus for wireless communication, the apparatus comprising:
a memory; and
one or more processors coupled to the memory, the memory and the one or more processors being configured to:
determine a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream and a DM-RS for the private stream; generate, based on the DM-RS configuration, a downlink control information (DCI) indicating the downlink transmission;
transmit, to a user equipment (UE), the DCI;
generate, based on the DM-RS configuration, the downlink transmission; and transmit, to the UE, the downlink transmission.

Aspect 31. An apparatus for wireless communication (e.g., the apparatus configured for use at a user equipment (UE), the apparatus comprising:
means for receiving, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream;
means for determining, based on the DCI, a DM-RS configuration for the DM-RS for the common stream and for the DM-RS for the private stream; and
means for receiving, based on the DM-RS configuration, the downlink transmission.

Aspect 32. The apparatus for wireless communication according to aspect 31, further comprising means for carrying out the method of any of aspects 2 to 19.

Aspect 33. An apparatus for wireless communication (e.g., the apparatus configured for use at a network entity), the apparatus comprising:
means for determining a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream and a DM-RS for the private stream;
means for generating, based on the DM-RS configuration, a downlink control information (DCI) indicating the downlink transmission;
means for transmitting, to a user equipment (UE), the DCI;
means for generating, based on the DM-RS configuration, the downlink transmission; and
means for transmitting, to the UE, the downlink transmission.

Aspect 34. The apparatus for wireless communication according to aspect 33, further comprising means for carrying out the method of any of aspects 21 to 28.

Aspect 35. A non-transitory computer-readable medium storing one or more instructions for wireless communication, the one or more instructions, when executed by one or more processors, cause the one or more processors to:
receive, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream and a DM-RS for the private stream;
determine, based on the DCI, a DM-RS configuration for the DM-RS for the common stream and for the DM-RS for the private stream; and
receive, based on the DM-RS configuration, the downlink transmission.

Aspect 36. A non-transitory computer-readable medium storing one or more instructions for wireless communication, the one or more instructions, when executed by one or more processors, cause the one or more processors to:
determine a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream and a DM-RS for the private stream; generate, based on the DM-RS configuration, a downlink control information (DCI) indicating the downlink transmission;
transmit, to a user equipment (UE), the DCI;
generate, based on the DM-RS configuration, the downlink transmission; and
transmit, to the UE, the downlink transmission.

Aspect 37. A computer program comprising instructions which, when the program is executed by a computer, cause the computer to carry out the method of any of aspects 1 to 19 or 20 to 28.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various aspects. In fact, many of these features may be combined in ways not specifically recited in the claims and/or dis-closed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchange-ably with "one or more." Where only one item is intended, the phrase "only one" or similar language is used. Also, as used herein, the terms "has," "have," "having," and/or the like are intended to be open-ended terms.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The invention claimed is:

1. A method of wireless communication, the method performed at a user equipment (UE), the method comprising:
   receiving, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream, and a DM-RS for the private stream;
   determining, based on the DCI, a DM-RS configuration for the DM-RS for the common stream and for the DM-RS for the private stream, wherein the DM-RS configuration comprises one or more DM-RS ports for the DM-RS for the common stream, one or more DM-RS ports for the DM-RS for the private stream, or a combination thereof, and wherein one or more fields in the DCI indicate the one or more DM-RS ports for the DM-RS for the common stream, the one or more DM-RS ports for the DM-RS for the private stream, or the combination thereof; and
   receiving, based on the DM-RS configuration, the downlink transmission.

2. The method of claim 1, wherein one or more fields in the DCI indicate a set of DM-RS ports for the downlink transmission, a number of layers for the common stream, and a number of layers for the private stream, and wherein determining the DM-RS configuration further comprises:
   determining the one or more DM-RS ports for the DM-RS for the common stream as a first subset of the set of DM-RS ports having a number of elements equal to the number of layers for the common stream; and
   determining the one or more DM-RS ports for the DM-RS for the private stream as a second subset of the set of DM-RS ports having a number of elements equal to the number of layers for the private stream.

3. The method of claim 1, wherein first one or more fields in the DCI indicate a presence of the common stream in the downlink transmission and a set of DM-RS ports for the downlink transmission, and wherein determining the DM-RS configuration further comprises:
   determining, based on the indicated presence of the common stream, a first subset of the set of DM-RS ports as the one or more DM-RS ports for the DM-RS for the common stream; and
   determining, based on the indicated presence of the common stream, a second subset of the set of DM-RS ports as the one or more DM-RS ports for the DM-RS for the private stream.

4. The method of claim 3, wherein second one or more fields in the DCI indicate a number of layers for the downlink transmission, and the first subset is further determined based on the number of layers.

5. The method of claim 1, wherein one or more fields in the DCI indicate a set of DM-RS ports for the downlink transmission, and wherein determining the DM-RS configuration further comprises:
   determining, based on the set of the DM-RS ports, a plurality of CDM groups, each CDM group corresponding to an individual DM-RS port in the set of DM-RS ports;
   determining a first subset of the set of DM-RS ports as the one or more DM-RS ports for the DM-RS for the common stream based on the plurality of CDM groups; and
   determining a second subset of the set of DM-RS ports as the one or more DM-RS ports for the DM-RS for the private stream based on the plurality of CDM groups.

6. The method of claim 5, wherein the first subset of the set of DM-RS ports is associated with a first CDM group of the plurality of CDM groups, wherein the second subset of the set of DM-RS ports is associated with a second CDM group of the plurality of CDM groups, and wherein the first CDM group is different from the second CDM group.

7. The method of claim 1, wherein the DM-RS configuration comprises an identifier for initialization of a DM-RS sequence for the DM-RS for the common stream, an identifier for initialization of a DM-RS sequence for the DM-RS for the private stream, or a combination thereof, wherein the identifier for initialization of the DM-RS sequence for the DM-RS for the common stream is different from the identifier for initialization of the DM-RS sequence for the DM-RS for the private stream.

8. The method of claim 7, the method further comprising:
   receiving one or more first identifiers and a second identifier; and wherein determining the DM-RS configuration further comprises:
   determining the identifier for initialization of the DM-RS sequence for the DM-RS for the private stream based on the one or more first identifiers; and
   determining the identifier for initialization of the DM-RS sequence for the DM-RS for the common stream based on the second identifier.

9. The method of claim 8, wherein determining the identifier for initialization of the DM-RS sequence for the DM-RS for the common stream is further based on a slot number and one or more symbol numbers of the DM-RS for the common stream.

10. The method of claim 7, the method further comprising:
    receiving one or more first identifiers;
    and wherein the determining the DM-RS configuration further comprises:
    determining the identifier for initialization of the DM-RS sequence for the DM-RS for the private stream based on the one or more first identifiers; and
    determining that a second identifier has not been received at the UE and in response thereto:
    determining the second identifier based on a cell identifier of the network entity; and
    determining the identifier for initialization of the DM-RS sequence for the DM-RS for the common stream based on the second identifier.

11. The method of claim 10, wherein determining that the second identifier has not been received at the UE further comprises:
    determining that the cell identifier of the network entity is equal to any of the one or more first identifiers and in response thereto:

determining the second identifier is further based on an offset value.

12. The method of claim 1, wherein a density of the DM-RS for the common stream in an orthogonal frequency-division multiplexing (OFDM) resource grid, a density of the DM-RS for the private stream in the OFDM resource grid, or any combination thereof, and wherein the density of the DM-RS for the common stream in the OFDM resource grid is a non-constant function of the one or more DM-RS ports, or the density of the DM-RS for the private stream in the OFDM resource grid is a non-constant function of the one or more DM-RS ports, or a combination thereof.

13. The method of claim 1, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, wherein the density of the DM-RS for the common stream in the OFDM resource grid in a slot including the downlink transmission equals to a first number of symbols per slot and the density of the DM-RS for the private stream in the OFDM resource grid in the slot including the downlink transmission equals to a second number of symbols per slot, and wherein the first number is higher than the second number.

14. The method of claim 1, the method further comprising:
receiving configuration information;
and wherein determining the DM-RS configuration further comprises:
determining one or more symbol numbers for the DM-RS for the common stream based on the configuration information; and
determining one or more symbol numbers for the DM-RS for the private stream based on the configuration information.

15. The method of claim 1, wherein determining the DM-RS configuration further comprises:
determining one or more symbol numbers for the DM-RS for the common stream based on a duration of physical downlink shared channel (PDSCH) indicated in the DCI, an ending symbol number of the PDSCH indicated in the DCI, a modulation and coding scheme (MCS) for the common stream indicated in the DCI, an MCS for the private stream indicated in the DCI, a number of layers associated with the common stream indicated in the DCI, a number of layers associated with the private stream indicated in the DCI, a number of DM-RS ports associated with the common stream indicated in the DCI or a number of DM-RS ports associated with the private stream indicated in the DCI, or any combination thereof; and
determining one or more symbol numbers for the DM-RS for the private stream based on a duration of physical downlink shared channel (PDSCH) indicated in the DCI, an ending symbol number of the PDSCH indicated in the DCI, a modulation and coding scheme (MCS) for the common stream indicated in the DCI, an MCS for the private stream indicated in the DCI, a number of layers associated with the common stream indicated in the DCI, a number of layers associated with the private stream indicated in the DCI, a number of DM-RS ports associated with the common stream indicated in the DCI or a number of DM-RS ports associated with the private stream indicated in the DCI, or any combination thereof.

16. The method of claim 1, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid equals to a first number of subcarriers in a frequency domain resource assignment indicated by the DCI and the density of the DM-RS for the private stream in the OFDM resource grid equals to a second number of subcarriers in the frequency domain resource assignment indicated by the DCI, and wherein the first number is higher than the second number.

17. The method of claim 16, wherein the first number corresponds to all subcarriers in the frequency domain resource assignment indicated by the DCI.

18. The method of claim 1, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid and the density of the DM-RS for the private stream in the OFDM resource grid is such that one or more symbols of the OFDM resource grid include one or more resource elements only for a subset of DM-RS ports corresponding to the DM-RS for the common stream or to the DM-RS for the private stream.

19. A method of wireless communication, the method performed at a network entity, the method comprising:
determining a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream, and a DM-RS for the private stream;
generating, based on the DM-RS configuration, a downlink control information (DCI) indicating the downlink transmission, wherein the DM-RS configuration comprises one or more DM-RS ports for the DM-RS for the common stream, one or more DM-RS ports for the DM-RS for the private stream, or a combination thereof, and wherein one or more fields in the DCI indicate the one or more DM-RS ports for the DM-RS for the common stream, the one or more DM-RS ports for the DM-RS for the private stream, or the combination thereof;
transmitting, to a user equipment (UE), the DCI;
generating, based on the DM-RS configuration, the downlink transmission; and
transmitting, to the UE, the downlink transmission.

20. The method of claim 19, wherein one or more fields in the DCI indicate a set of DM-RS ports for the downlink transmission, a number of layers for the common stream and a number of layers for the private stream, to enable the UE to determine the one or more DM-RS ports for the DM-RS for the common stream as a first subset of the set of DM-RS ports having a number of elements equal to the number of layers for the common stream and to determine the one or more DM-RS ports for the DM-RS for the private stream as a second subset of the set of DM-RS ports having a number of elements equal to the number of layers for the private stream.

21. The method of claim 19, wherein one or more fields in the DCI indicate a set of DM-RS ports for the downlink transmission to enable the UE to determine, based on the set of the DM-RS ports, a plurality of CDM groups, each CDM group corresponding to an individual DM-RS port in the set of DM-RS ports, to determine a first subset of the set of DM-RS ports as the one or more DM-RS ports for the DM-RS for the common stream based on the plurality of CDM groups and to determine a second subset of the set of DM-RS ports as the one or more DM-RS ports for the DM-RS for the private stream based on the plurality of CDM groups.

22. The method of claim 19, the DM-RS configuration comprises an identifier for initialization of a DM-RS sequence for the DM-RS for the common stream, an identifier for initialization of a DM-RS sequence for the DM-RS for the private stream, or a combination thereof, wherein the identifier for initialization of the DM-RS sequence for the DM-RS for the common stream is different from the identifier for initialization of the DM-RS sequence for the DM-RS for the private stream.

23. The method of claim 22, the method further comprising:
transmitting one or more first identifiers and a second identifier, to enable the UE to determine the identifier for initialization of the DM-RS sequence for the DM-RS for the private stream based on the one or more first identifiers and to determine the identifier for initialization of the DM-RS sequence for the DM-RS for the common stream based on the second identifier.

24. The method of claim 19, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid is a non-constant function of the one or more DM-RS ports, or the density of the DM-RS for the private stream in the OFDM resource grid is a non-constant function of the one or more DM-RS ports, or a combination thereof.

25. The method of claim 19, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid in a slot including the downlink transmission equals to a first number of symbols per slot and the density of the DM-RS for the private stream in the OFDM resource grid in the slot including the downlink transmission equals to a second number of symbols per slot, and wherein the first number is higher than the second number.

26. The method of claim 19, wherein the DM-RS configuration comprises a density of the DM-RS for the common stream in an orthogonal frequency-division multiplexing (OFDM) resource grid, a density of the DM-RS for the private stream in the OFDM resource grid, or a combination thereof, and wherein the density of the DM-RS for the common stream in the OFDM resource grid equals to a first number of subcarriers in a frequency domain resource assignment indicated by the DCI and the density of the DM-RS for the private stream in the OFDM resource grid equals to a second number of subcarriers in the frequency domain resource assignment indicated by the DCI, and wherein the first number is higher than the second number.

27. An apparatus for wireless communication, the apparatus comprising:
a memory; and
one or more processors coupled to the memory, the memory and the one or more processors being configured to:
receive, from a network entity, downlink control information (DCI) for a downlink transmission, wherein the downlink transmission is based on a rate-splitting multiple access scheme, and wherein the downlink transmission comprises a common stream, a demodulation reference signal (DM-RS) for the common stream, a private stream, and a DM-RS for the private stream;
determine, based on the DCI, a DM-RS configuration for the DM-RS for the common stream and for the DM-RS for the private stream, wherein the DM-RS configuration comprises one or more DM-RS ports for the DM-RS for the common stream, one or more DM-RS ports for the DM-RS for the private stream, or a combination thereof, and wherein one or more fields in the DCI indicate the one or more DM-RS ports for the DM-RS for the common stream, the one or more DM-RS ports for the DM-RS for the private stream, or the combination thereof; and
receive, based on the DM-RS configuration, the downlink transmission.

28. An apparatus for wireless communication, the apparatus comprising:
a memory; and
one or more processors coupled to the memory, the memory and the one or more processors being configured to:
determine a demodulation reference signal (DM-RS) configuration for a downlink transmission, wherein the downlink transmission is based on a rate-splitting multiple access scheme, and wherein the downlink transmission comprises a common stream, a DM-RS for the common stream, a private stream, and a DM-RS for the private stream;
generate, based on the DM-RS configuration, a downlink control information (DCI) indicating the downlink transmission, wherein the DM-RS configuration comprises one or more DM-RS ports for the DM-RS for the common stream, one or more DM-RS ports for the DM-RS for the private stream, or a combination thereof, and wherein one or more fields in the DCI indicate the one or more DM-RS ports for the DM-RS for the common stream, the one or more DM-RS ports for the DM-RS for the private stream, or the combination thereof;
transmit, to a user equipment (UE), the DCI;
generate, based on the DM-RS configuration, the downlink transmission; and
transmit, to the UE, the downlink transmission.

* * * * *